US012586212B2

(12) United States Patent
Yoshinaga et al.

(10) Patent No.: US 12,586,212 B2
(45) Date of Patent: Mar. 24, 2026

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Motoki Yoshinaga, Kanagawa (JP); Masami Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 18/476,998

(22) Filed: Sep. 28, 2023

(65) Prior Publication Data
US 2024/0112352 A1 Apr. 4, 2024

(30) Foreign Application Priority Data
Sep. 30, 2022 (JP) ................................. 2022-158760

(51) Int. Cl.
G06T 7/20 (2017.01)
(52) U.S. Cl.
CPC ...... G06T 7/20 (2013.01); *G06T 2207/20081* (2013.01)
(58) Field of Classification Search
CPC .................. G06N 3/0464; G06N 3/098; G06T 2207/20081; G06T 7/20; G06T 1/0014; G06T 1/0007; G06T 9/002; G06T 9/008; G06T 2207/10; G06T 2207/20; G06T 2210/12
See application file for complete search history.

(56) References Cited

U.S. PATENT DOCUMENTS

| | | | | |
|---|---|---|---|---|
| 10,762,644 | B1 * | 9/2020 | Mahadevan | ............. G06N 3/09 |
| 2018/0129906 | A1 * | 5/2018 | Habibian | ............... G06V 10/82 |
| 2019/0057314 | A1 * | 2/2019 | Julian | ..................... H04L 67/34 |
| 2019/0138833 | A1 * | 5/2019 | Xiong | ................... G06V 10/25 |

(Continued)

FOREIGN PATENT DOCUMENTS

| | | |
|---|---|---|
| JP | 2017139725 A | 8/2017 |
| JP | 2018509712 A | 4/2018 |

OTHER PUBLICATIONS

Bo Li et al. , "High Performance Visual Tracking with Siamese Region Proposal Network," Jun. 2018, Proceedings of the IEEE Conference on Computer Vision and Pattern Recognition (CVPR), 2018,pp. 8971-8977.*

(Continued)

*Primary Examiner* — Omar S Ismail
(74) *Attorney, Agent, or Firm* — Canon U.S.A., Inc. IP Division

(57) ABSTRACT

An information processing apparatus comprises a processing unit configured to execute, in frame periods corresponding to respective frames, an inference relating to the frame and training relating to the frame. When an inference relating to a first frame has been completed but training relating to the first frame has not been completed in a first frame period corresponding to the first frame, the processing unit executes training relating to the first frame and an inference and training relating to a second frame in a second frame period corresponding to the second frame subsequent to the first frame.

17 Claims, 12 Drawing Sheets

(56) References Cited

U.S. PATENT DOCUMENTS

| | | | | |
|---|---|---|---|---|
| 2019/0147602 | A1* | 5/2019 | Tao | G06V 10/809 |
| | | | | 382/103 |
| 2019/0228266 | A1* | 7/2019 | Habibian | G06N 3/044 |
| 2019/0332935 | A1* | 10/2019 | Sanchez Bermudez | |
| | | | | G06N 20/10 |
| 2020/0026954 | A1* | 1/2020 | Rhodes | G06N 3/0464 |
| 2020/0184341 | A1* | 6/2020 | Ide | G06N 3/0475 |
| 2021/0090284 | A1* | 3/2021 | Ning | G06V 10/82 |
| 2021/0150728 | A1* | 5/2021 | Ahmed | G06V 10/82 |
| 2021/0224564 | A1* | 7/2021 | Xu | G06V 20/64 |
| 2021/0383171 | A1* | 12/2021 | Lee | G06F 18/217 |
| 2021/0397254 | A1* | 12/2021 | Seibel | G06V 10/764 |
| 2022/0020158 | A1* | 1/2022 | Ning | G06V 10/25 |

OTHER PUBLICATIONS

Da Zhang et al.,"Deep Reinforcement Learning for Visual Object Tracking in Videos," Apr. 10, 2017, arXiv:1701.08936v2,pp. 1-7.*

Zhu Teng et al.,"Deep Spatial and Temporal Network for Robust Visual Object Tracking," Nov. 27, 2019,IEEE Transactions on Image Processing, vol. 29, 2020, pp. 1762-1768.*

Jinghao Zhou et al.,"Discriminative and Robust Online Learning for Siamese Visual Tracking," Apr. 3, 2020,The Thirty-Fourth AAAI Conference on Artificial Intelligence (AAAI-20),pp. 13017-13020.*

Andreas Robinson et al.,"Learning Fast and Robust Target Models for Video Object Segmentation," Jun. 2020, Proceedings of the IEEE/CVF Conference on Computer Vision and Pattern Recognition (CVPR), 2020,pp. 7406-7413.*

Lichao Zhang et al.,"Learning the Model Update for Siamese Trackers," Oct. 2019,Proceedings of the IEEE/CVF International Conference on Computer Vision (ICCV), 2019,pp. 4010-4016.*

Siyuan Cheng et al.,"Learning to Filter: Siamese Relation Network for Robust Tracking," Jun. 2021, of the IEEE/CVF Conference on Computer Vision and Pattern Recognition (CVPR), 2021, pp. 4421-4427.*

Hanxi Li et al.,"Robust Online Visual Tracking with a Single Convolutional Neural Network," Jan. 1, 2015, Computer Vision—ACCV 2014,pp. 194-207.*

Lituan Wang et al.,"Trajectory Predictor by Using Recurrent Neural etworks in Visual Tracking," Sep. 14, 2017, IEEE Transactions on Cybernetics, vol. 47, No. 10, Oct. 2017,pp. 3172-3181.*

Peter Ondruska et al.,"Deep Tracking: Seeing Beyond Seeing Using Recurrent Neural Networks," Mar. 5, 2016, Proceedings of the Thirtieth AAAI Conference on Artificial Intelligence (AAAI-16),pp. 3361-3365.*

F. Lotfi et al.,"Robust Object Tracking Based on Reurrent Neural Networks," Mar. 4, 2019, 2018 6th RSI International Conference on Robotics and Mechatronics (IcRoM),Oct. 23-25, 2018,Tehran, Iran. ,pp. 507-510.*

J. Zhou, et al., "Discriminative and Robust Online Learning for Siamese Visual Tracking", vol. 34, No. 07: AAAI-20, Technical Tracks 7, School of Computer Science and Automation, Northwestern Polytechnical University, China (2020).

* cited by examiner

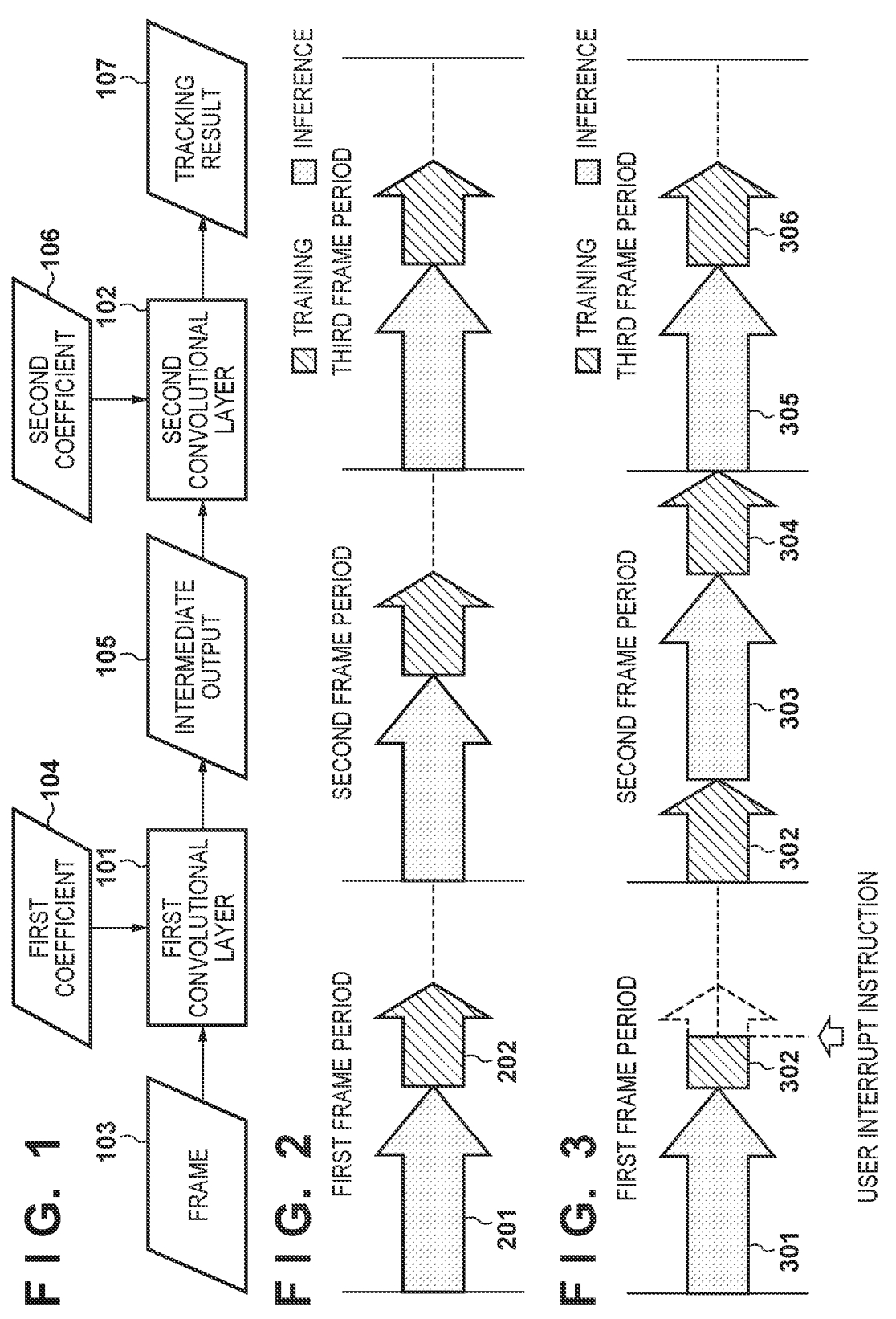

F I G. 4

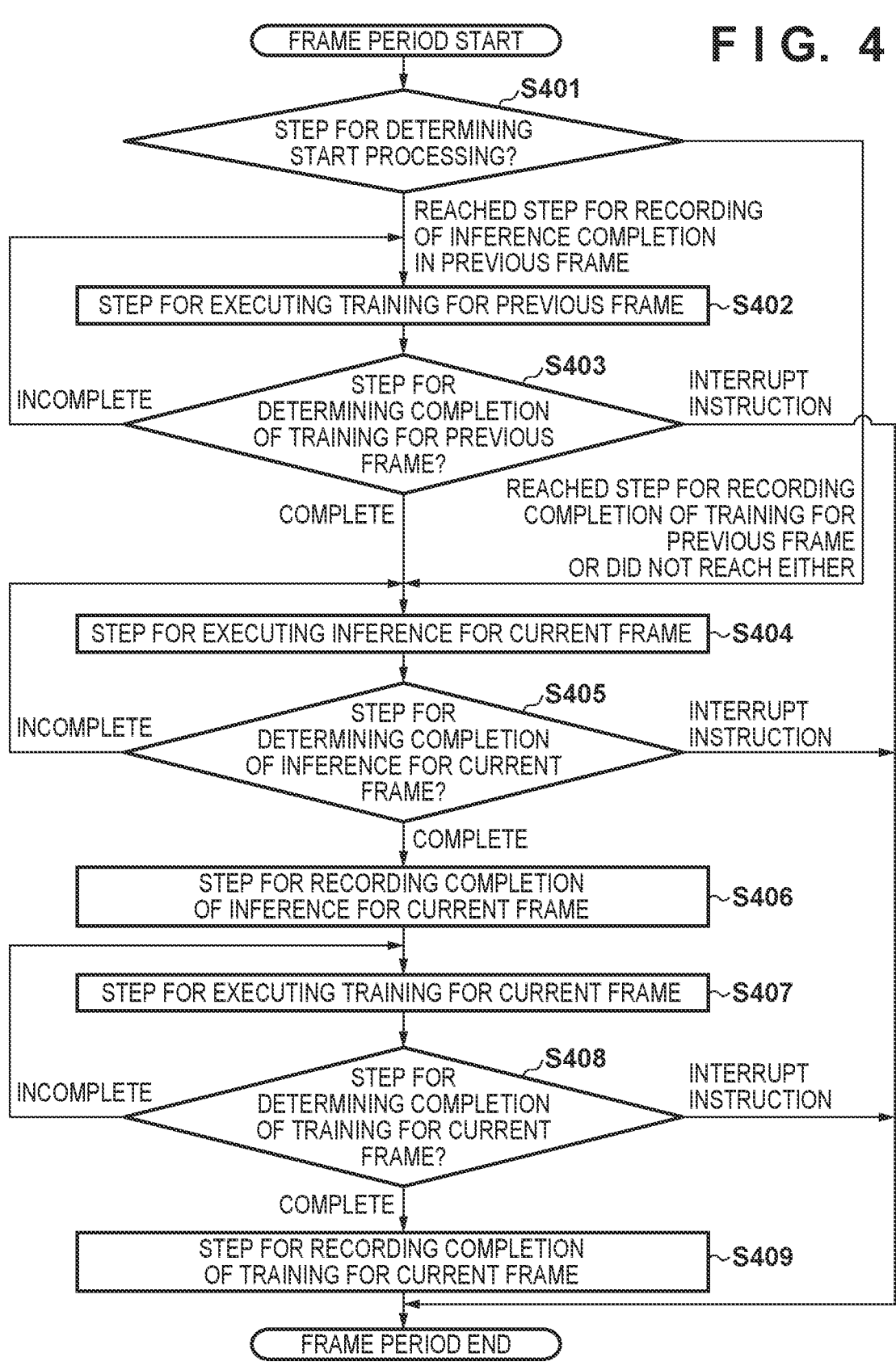

FRAME PERIOD START

S401

STEP FOR DETERMINING
START PROCESSING?

REACHED STEP FOR RECORDING
OF INFERENCE COMPLETION
IN PREVIOUS FRAME

STEP FOR EXECUTING TRAINING FOR PREVIOUS FRAME ~S402

S403

STEP FOR
DETERMINING COMPLETION
OF TRAINING FOR PREVIOUS
FRAME?

INCOMPLETE

INTERRUPT
INSTRUCTION

COMPLETE

REACHED STEP FOR RECORDING
COMPLETION OF TRAINING FOR
PREVIOUS FRAME
OR DID NOT REACH EITHER

STEP FOR EXECUTING INFERENCE FOR CURRENT FRAME ~S404

S405

STEP FOR
DETERMINING COMPLETION
OF INFERENCE FOR CURRENT
FRAME?

INCOMPLETE

INTERRUPT
INSTRUCTION

COMPLETE

STEP FOR RECORDING COMPLETION
OF INFERENCE FOR CURRENT FRAME ~S406

STEP FOR EXECUTING TRAINING FOR CURRENT FRAME ~S407

S408

STEP FOR
DETERMINING COMPLETION
OF TRAINING FOR CURRENT
FRAME?

INCOMPLETE

INTERRUPT
INSTRUCTION

COMPLETE

STEP FOR RECORDING COMPLETION
OF TRAINING FOR CURRENT FRAME ~S409

FRAME PERIOD END

F I G. 5
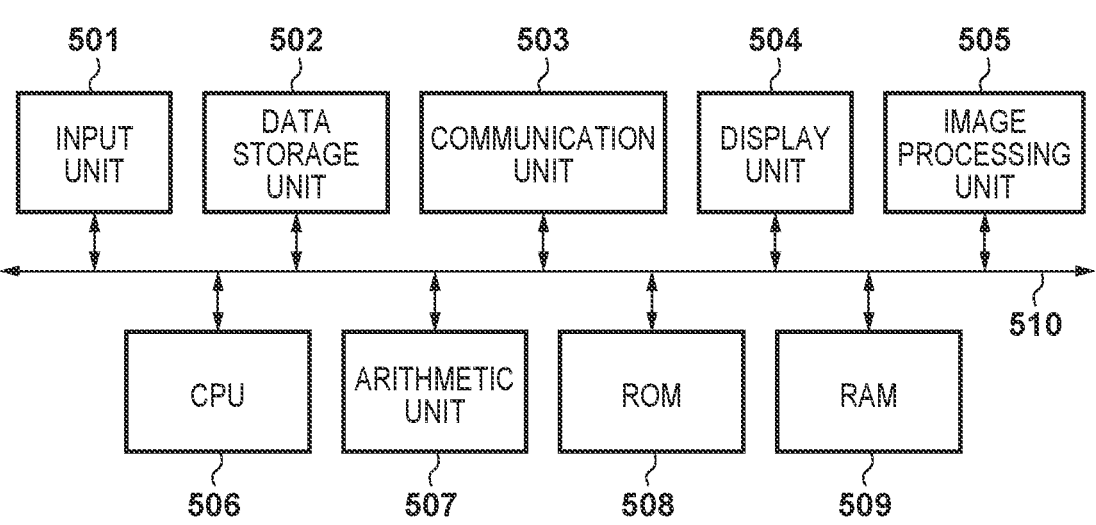
F I G. 6
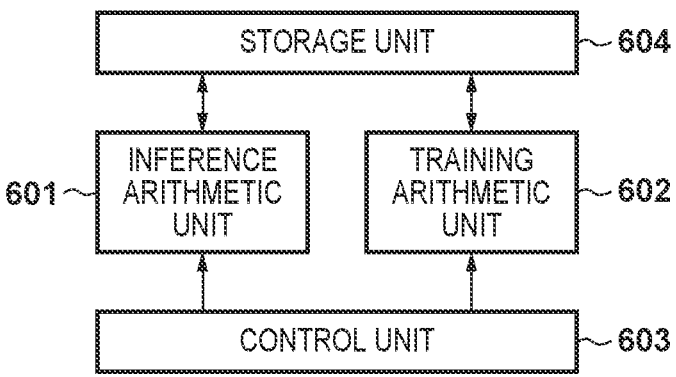

FIG. 7

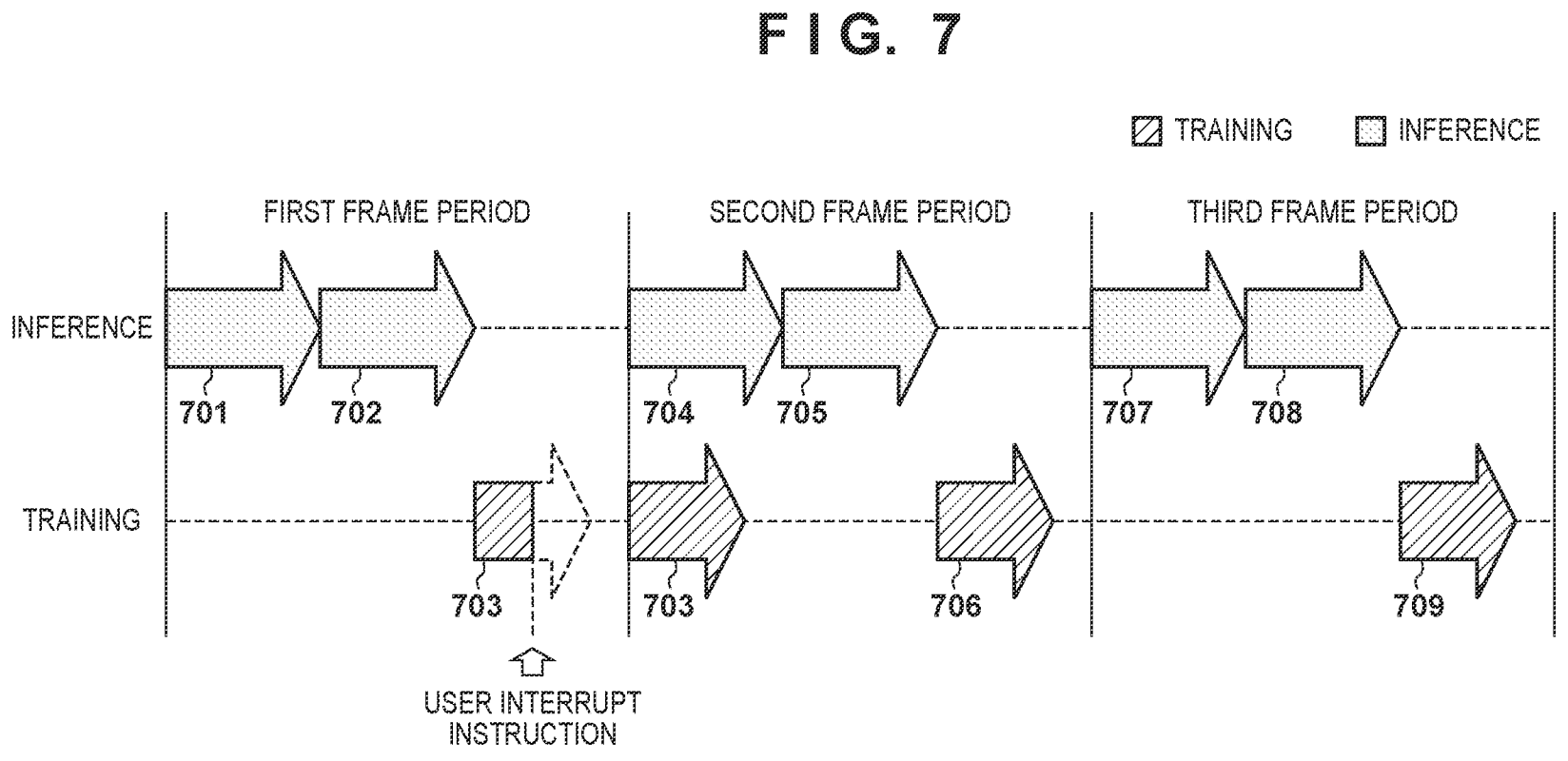

TRAINING ▨     INFERENCE ▨

FIRST FRAME PERIOD

701

702

703

SECOND FRAME PERIOD

704

705

703

706

THIRD FRAME PERIOD

707

708

709

INFERENCE

TRAINING

USER INTERRUPT INSTRUCTION

F I G. 8B
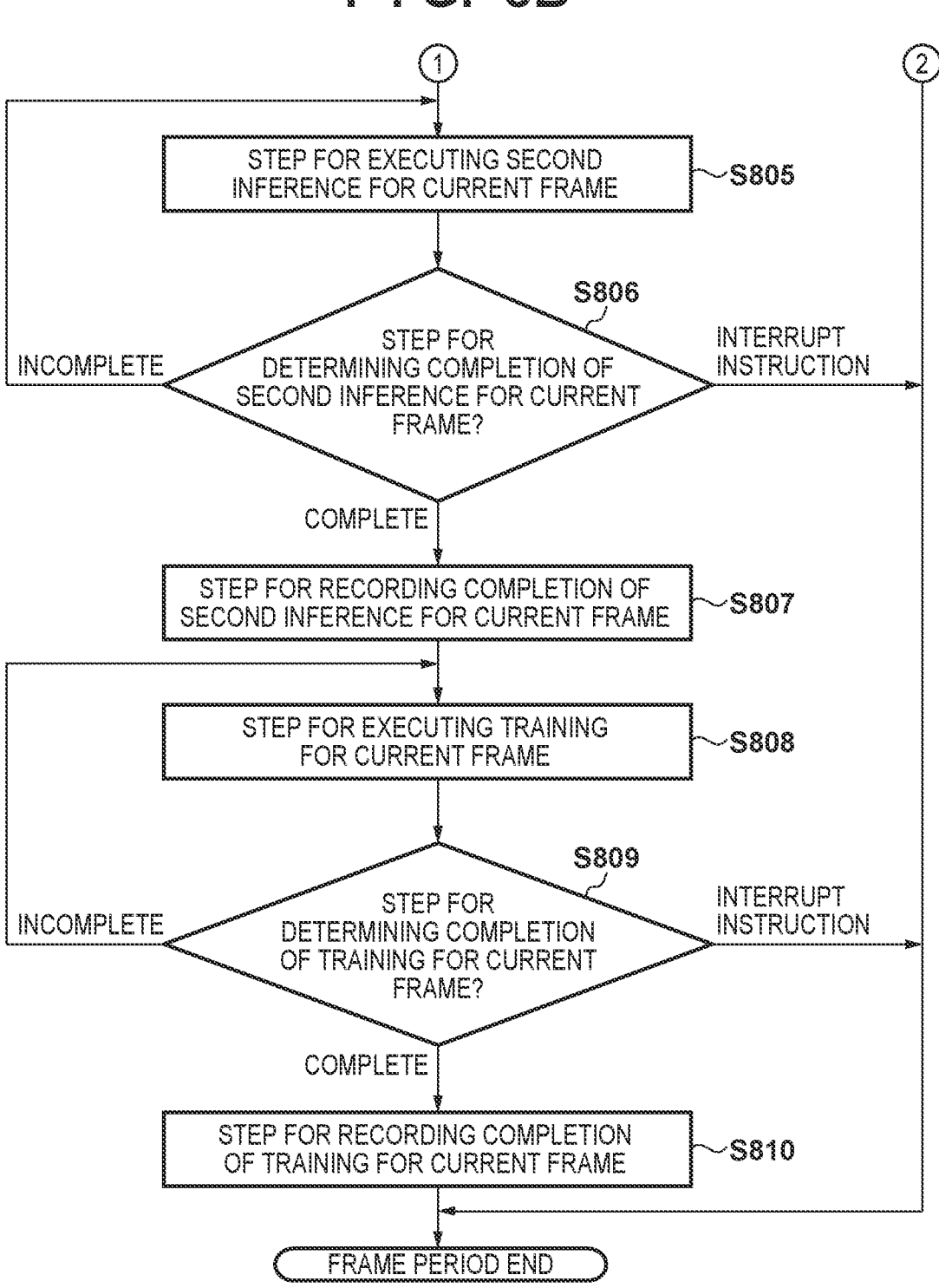

F I G. 9

F I G. 10A
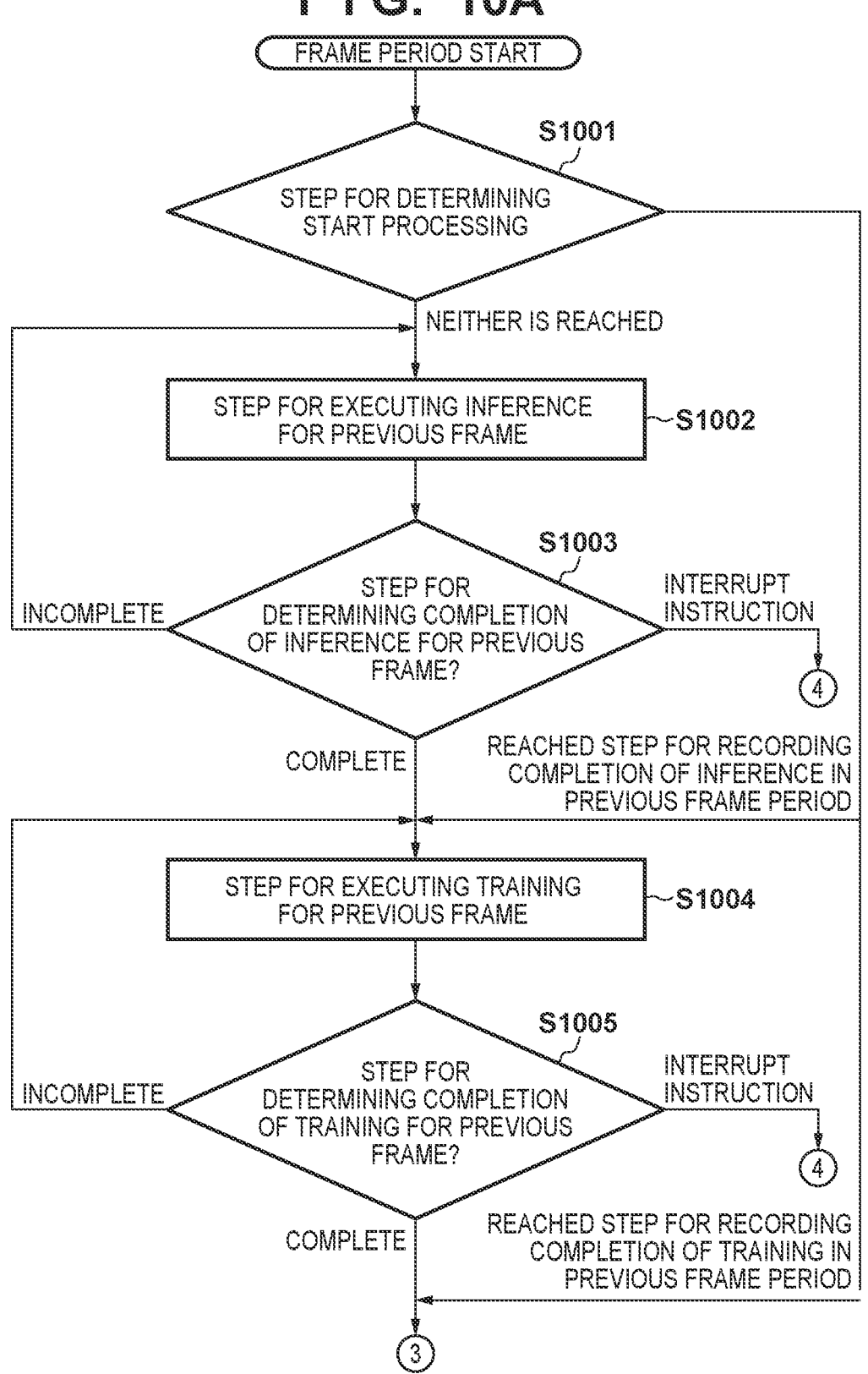

F I G. 10B
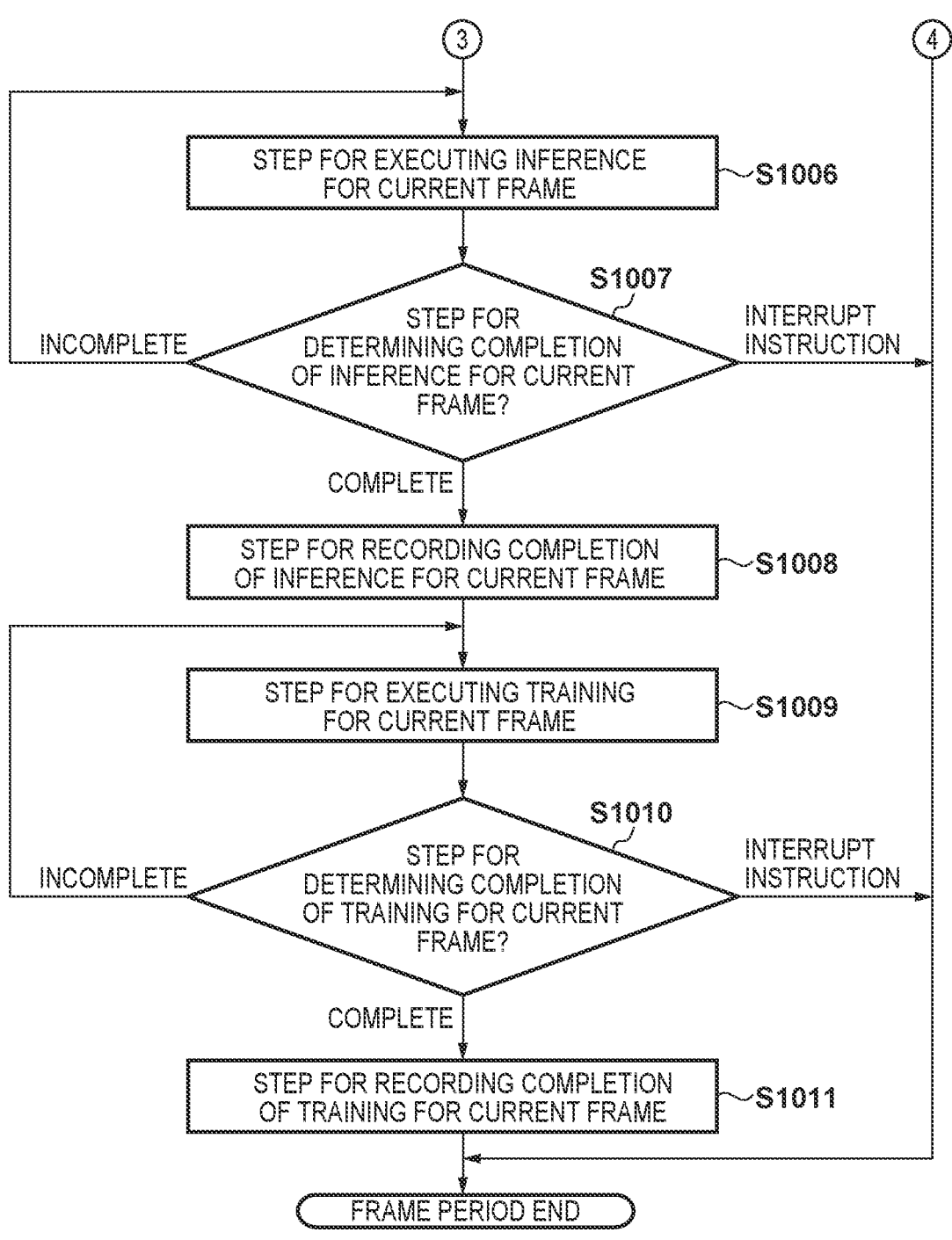

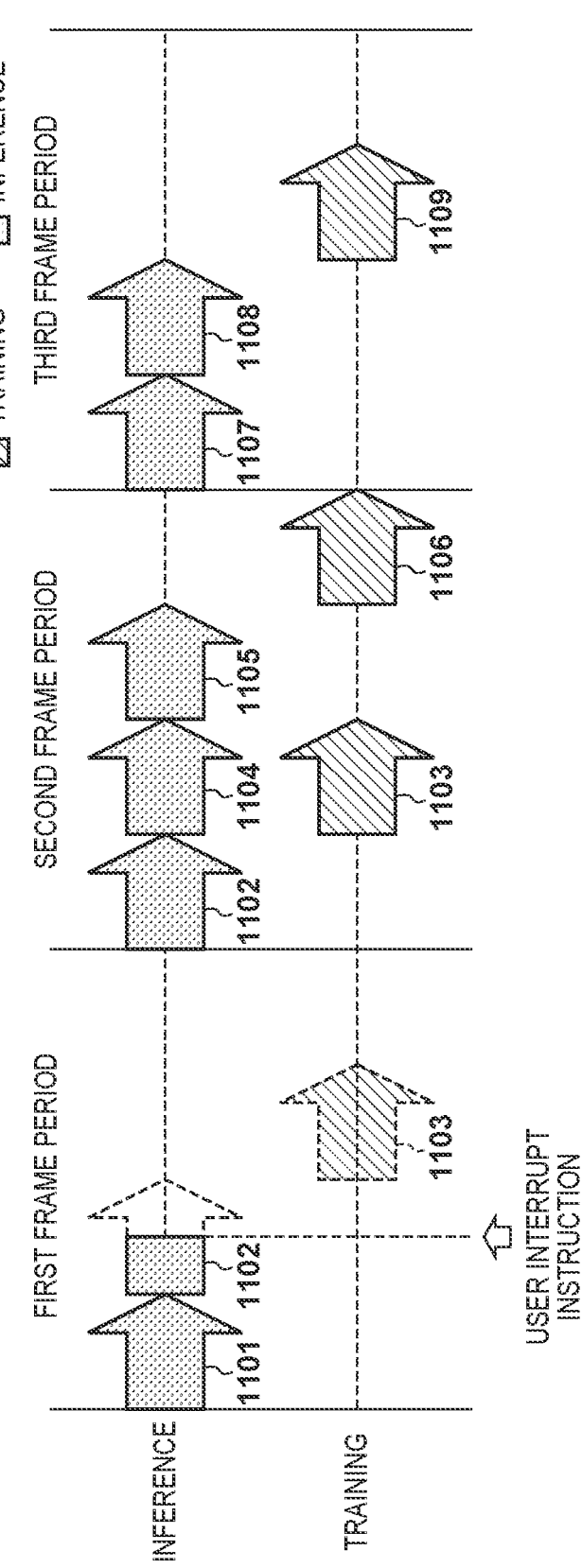
F I G.  11

F I G. 12A
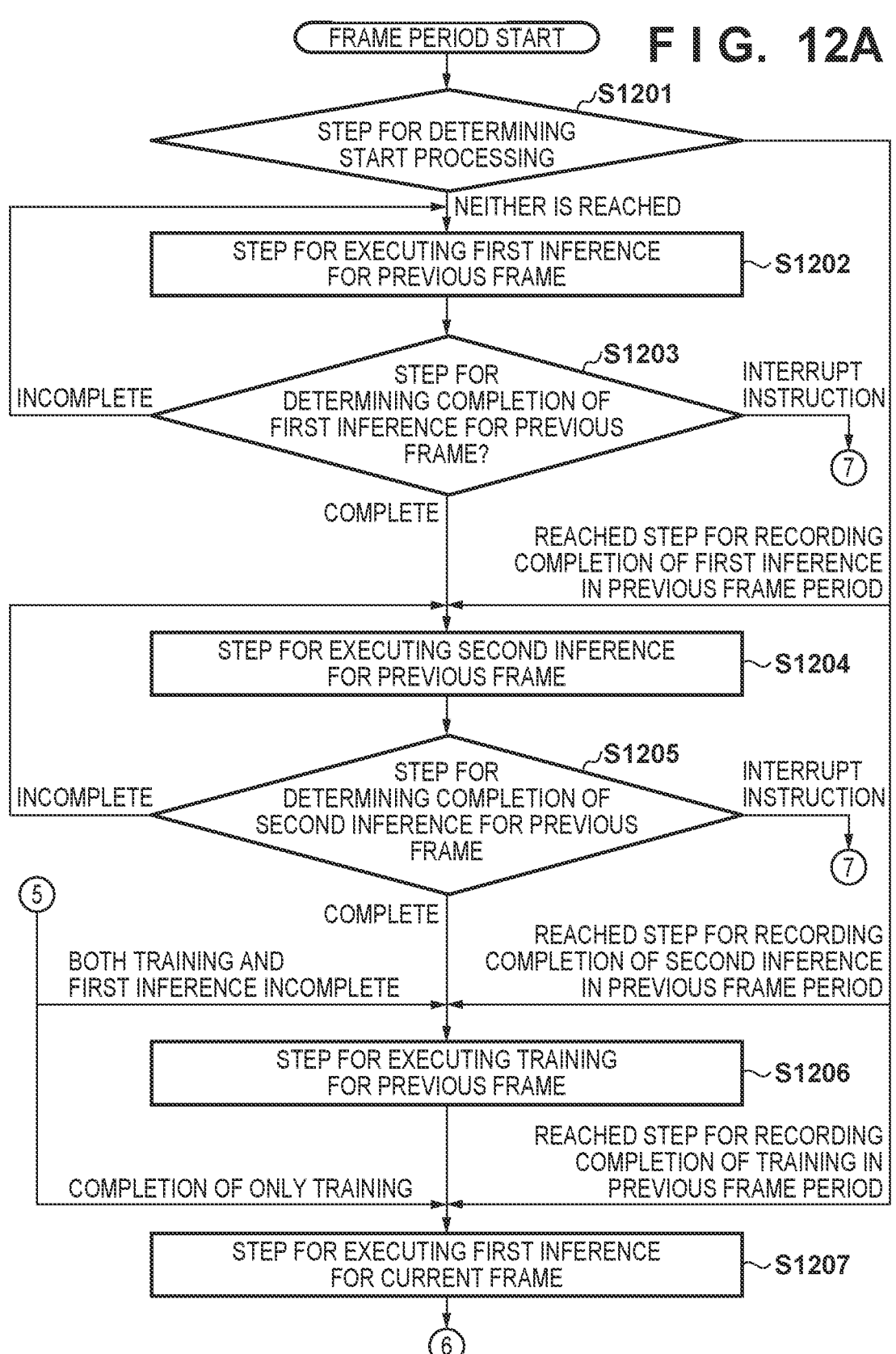

F I G. 12B
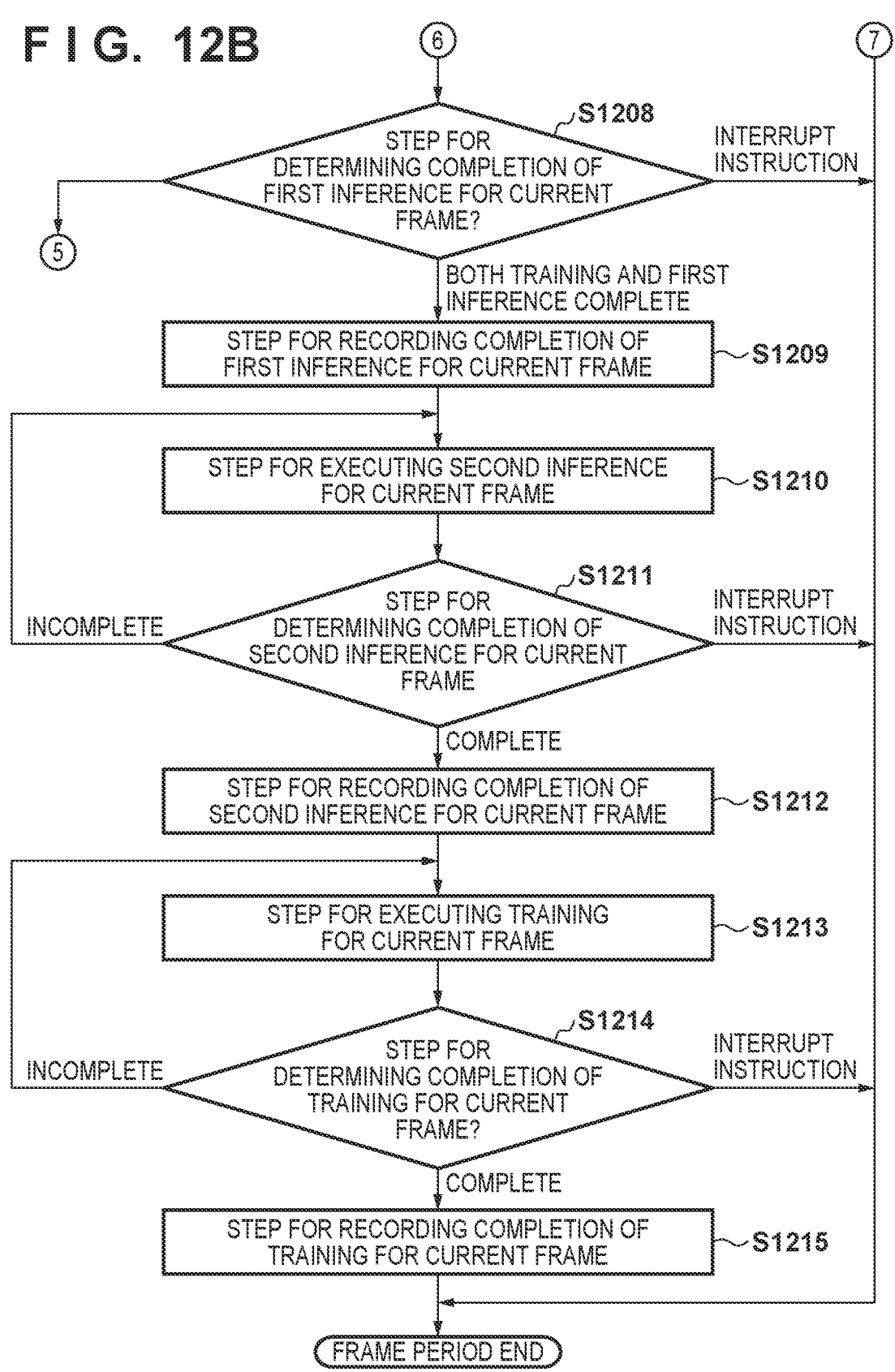

INFORMATION PROCESSING APPARATUS, INFORMATION PROCESSING METHOD, AND NON-TRANSITORY COMPUTER-READABLE STORAGE MEDIUM

BACKGROUND

Field of the Disclosure

The present disclosure relates to techniques relating to inferencing and learning/training.

Description of the Related Art

Machine learning is one effective method used in the task for tracking an object in an image across a plurality of frames. Typically, in object tracking using machine learning, an identification model, such as a neural network or support vector machine, is used to detect the tracking target in each frame. This step is called inferencing, and the step in which the parameters of the identification model are updated on the basis of the inference result is called training.

Online training is often used in object tracking using machine learning. In "Discriminative and Robust Online Learning for Siamese Visual Tracking", J. Zhou et al., Vol 34 No 07: AAAI-20 Technical Tracks 7 (2020), a method for object tracking using a neural network is described. The method described in "Discriminative and Robust Online Learning for Siamese Visual Tracking", J. Zhou et al., Vol 34 No 07: AAAI-20 Technical Tracks 7 (2020) includes one or more of the parameters of the identification model being updated using the result of the inference for each frame. Accordingly, a single type of identification model can be used to track an object with various features.

However, when object tracking is actually performed, the processing is sometimes interrupted during a frame period. In Japanese Patent Laid-Open No. 2017-139725, a multi-camera system using online training to track an object is described. In the camera system described in Japanese Patent Laid-Open No. 2017-139725, when a reset is performed via a user operation, the system returns to an initial state. In Japanese Unexamined Patent Application Publication (Translation of PCT Application) No. 2018-509712, a method is described for performing online training for object recognition using machine learning. In the method described in Japanese Unexamined Patent Application Publication (Translation of PCT Application) No. 2018-509712, the online training is interrupted when input data corresponding to an outlier is received, and after restoration, the processing is restarted using the latest pre-interruption training result.

Desirably, the target tracking state from the interruption to after the restoration is retained via an application. For example, a surveillance camera may be installed with a function for recording still images when a specific movement of a tracking target is recognized. In such a case, the still image recording processing takes priority over the tracking processing, and thus the tracking processing is interrupted. This interrupts the tracking processing during a frame period, but desirably, the target tracking state is retained for the next frame onward.

To retain the target tracking state, it is important to retain the identification model parameter in the latest state. As the tracking target in an image is constantly changing orientation and size, the features slightly change in each frame. Due to a change in the feature, detection of the tracking target via inference for each frame may fail, causing the tracking state to be canceled. To prevent this, training needs to be performed every frame and inference needs to be performed using the learned parameter to which the latest feature has been applied.

However, with the camera system described in Japanese Patent Laid-Open No. 2017-139725, when the system returns to an initial state, online training needs to be redone in order to track the same object as before the interruption. With the method described in Japanese Unexamined Patent Application Publication (Translation of PCT Application) No. 2018-509712, tracking can be restarted using the pre-interruption learned parameter, but the result of the online training in the frame period when the interruption occurred cannot be applied.

SUMMARY

The present disclosure provides techniques for completing training relating to a frame before the time when an inference relating to a frame is executed.

According to the first aspect of the present disclosure, there is provided an information processing apparatus comprising: a processing unit configured to execute, in frame periods corresponding to respective frames, an inference relating to the frame and training relating to the frame, wherein when an inference relating to a first frame has been completed but training relating to the first frame has not been completed in a first frame period corresponding to the first frame, the processing unit executes training relating to the first frame and an inference and training relating to a second frame in a second frame period corresponding to the second frame subsequent to the first frame.

According to the second aspect of the present disclosure, there is provided an information processing method executed by an information processing apparatus, comprising: executing, in frame periods corresponding to respective frames, an inference relating to the frame and training relating to the frame; and when, in the executing, an inference relating to a first frame has been completed but training relating to the first frame has not been completed in a first frame period corresponding to the first frame, training relating to the first frame and an inference and training relating to a second frame in a second frame period corresponding to the second frame subsequent to the first frame are executed.

According to the third aspect of the present disclosure, there is provided a non-transitory computer-readable storage medium storing a computer program for causing a computer to function as a processing unit configured to execute, in frame periods corresponding to respective frames, an inference relating to the frame and training relating to the frame, wherein when an inference relating to a first frame has been completed but training relating to the first frame has not been completed in a first frame period corresponding to the first frame, the processing unit executes training relating to the first frame and an inference and training relating to a second frame in a second frame period corresponding to the second frame subsequent to the first frame.

Further features of the present disclosure will become apparent from the following description of exemplary embodiments with reference to the attached drawings.

BRIEF DESCRIPTION OF THE DRAWINGS

FIG. 1 is a block diagram illustrating a configuration example of an identification model and the data flow of the identification model.

FIG. 2 is a timechart.

FIG. 3 is a timechart.

FIG. 4 is a flowchart of the processing executed by an information processing apparatus.

FIG. 5 is a block diagram illustrating an example of the hardware configuration of the information processing apparatus.

FIG. 6 is a block diagram illustrating a configuration example of an arithmetic unit 507.

FIG. 7 is a timechart.

FIG. 8B is a flowchart of the processing executed by an information processing apparatus.

FIG. 9 is a timechart.

FIG. 10A is a flowchart of the processing executed by an information processing apparatus.

FIG. 10B is a flowchart of the processing executed by an information processing apparatus.

FIG. 11 is a timechart.

FIG. 12A is a flowchart of the processing executed by an information processing apparatus.

FIG. 12B is a flowchart of the processing executed by an information processing apparatus.

DESCRIPTION OF THE EMBODIMENTS

Figure 8A:
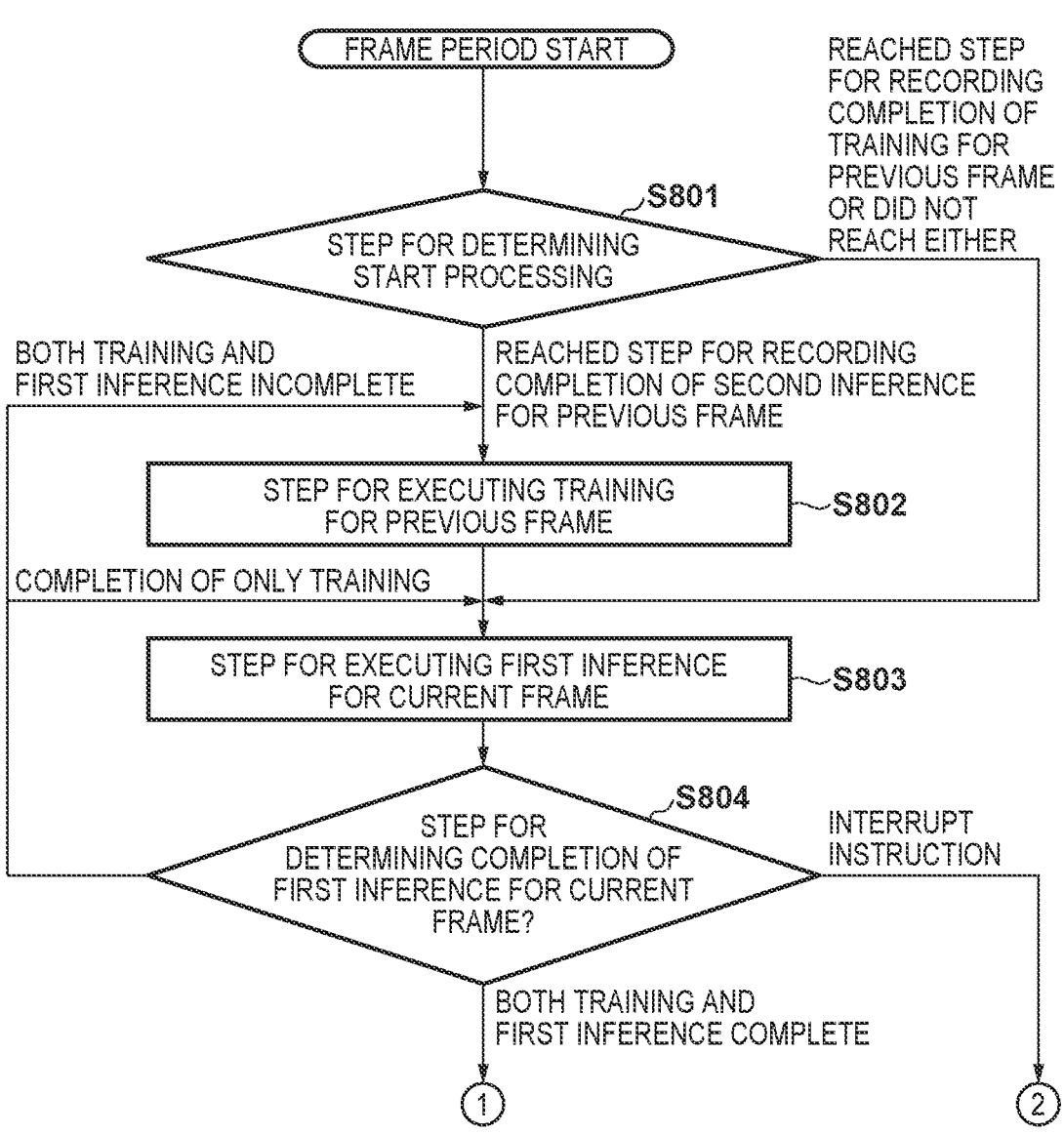
FIG. 8A is a flowchart of the processing executed by an information processing apparatus.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

In the present embodiment, with a configuration in which, in a frame period corresponding to each frame, an inference relating to the frame and training relating to the frame are executed, when an inference relating to a second frame has been completed in a second frame period corresponding to the second frame previous to a first frame but training relating to the second frame has not been completed in the second frame period, training relating to the second frame and an inference relating to the first frame are executed in a first frame period corresponding to the first frame. In this manner, training can be completed before an inference that requires the result of the next training.

In the present embodiment described below, tracking processing that uses an identification model for identifying a tracking target in a frame to identify a tracking target in a frame and track a tracking target is used as an example of inference processing. In the present embodiment, a convolutional neural network, which is an example of a hierarchical neural network, is used as the identification model, but other types of models may be used.

A configuration example of the identification model according to the present embodiment and the data flow of the identification model will be described below using the block diagram in FIG. 1. As illustrated in FIG. 1, the identification model includes a first convolutional layer 101 and a second convolutional layer 102.

The first convolutional layer 101 is set with a first coefficient 104 (weight coefficient for the first convolutional layer 101) as a learned parameter. Also, the second convolutional layer 102 is set with a second coefficient 106 (weight coefficient for the second convolutional layer 102) as a learned parameter. The first convolutional layer 101 set with the first coefficient 104 processes an input frame 103 and outputs to an intermediate output 105. The second convolutional layer 102 set with the second coefficient 106 processes the intermediate output 105 and outputs a tracking result 107 indicating tracking target information such as the position and size of the tracking target included in the frame 103.

The identification model runs the same for each frame that is input and executes processing (inference processing) to output a tracking result corresponding to the frame. Each frame that is input may be an image of each frame in a captured video or may be the still images captured periodically or non-periodically.

Also, in the present embodiment, the second convolutional layer 102 of the identification model corresponds to online training. In other words, the second coefficient 106 is trained (updated) each frame so that the second convolutional layer 102 can output a tracking result of more accurate tracking target information.

In the online training, the second coefficient 106 is trained (updated) using the intermediate output 105 input to the second convolutional layer 102 and the tracking result 107 output from the second convolutional layer 102. For example, as correct data, a map is prepared in advance with a label value of "1" assigned to a tracking target region in the frame 103 to be input to the first convolutional layer 101 and a label value of "0" assigned to a region other than the tracking target region in the frame 103. Also, the frame 103 is input into the first convolutional layer 101, and the intermediate output 105 to be output from the first convolutional layer 101 and the tracking result 107 to be output from the second convolutional layer 102 are obtained. Then, the difference (error) between the tracking result 107 and the correct data is obtained, and the intermediate output 105 is used to update the second coefficient 106 via a known method such as backpropagation or the like. Note that this online training method is a known technique, and thus will not be described further. Also, the online training method is not limited to a specific method.

As described above, updating the second coefficient 106 via the online training is required to retain the tracking state of the tracking target. The feature of a moving tracking target in a frame changes in each frame. To execute inference processing for each frame, that is, the processing of the identification model illustrated in FIG. 1, to continually detect the tracking target, the online training needs to be performed each frame and the second coefficient 106 corresponding to the changes in the feature needs to be continually obtained.

A timechart of the time allocations for executing inference processing and training processing for each frame is illustrated in FIG. 2. In the first frame period, which is a processing period corresponding to the first frame, first, inference processing 201 using the identification model is executed for the first frame. Thereafter, training processing 202 (online training of the second convolutional layer 102) of the identification model is executed using the result of the inference processing 201 to update the second coefficient 106. Thereafter, in the second frame period, which is a processing period corresponding to the second frame, first, inference processing using the identification model is executed for the second frame. Thereafter, training processing (online training of the second convolutional layer 102) of the identification model is executed using the result of the inference processing to update the second coefficient 106. Thereafter, in a third frame period, which is a processing period corresponding to the third frame, first, inference processing using the identification model is executed for the third frame. Thereafter, training processing (online training of the second convolutional layer 102) of the identification model is executed using the result of the inference processing to update the second coefficient 106. In this manner, by executing the inference processing and the training processing each frame period, tracking processing to tracking a tracking target is executed while updating the second coefficient 106.

A timechart according to the present embodiment is illustrated in FIG. 3. In the case illustrated in FIG. 3, training processing 302 in the first frame period is interrupted by an interrupt instruction from the user. Note that the interrupt instruction is not limited to an instruction input by a user and may be, for example, an instruction issued by a control unit such as the processor of an apparatus when a condition is satisfied or an instruction received from an external apparatus.

In this case, first, the training processing 302 that normally should have been executed in the first frame period is executed in the second frame period. Then, when the training processing 302 is completed, inference processing 303 using the identification model for the second frame is executed using the remaining time in the second frame period. Thereafter, training processing 304 of the identification model is executed using the result of the inference processing 303 to update the second coefficient 106. As in FIG. 2, in the third frame period, first, inference processing 305 using the identification model is executed for the third frame. Thereafter, training processing 306 of the identification model is executed using the result of the inference processing 305 to update the second coefficient 106.

In this manner, since the training processing 302 is completed before the inference processing 303 for the second frame period is executed, the second coefficient 106 of the identification model using the inference processing 303 can be updated before the start of the inference processing 303. In other words, when the training processing 302 in the first frame period is interrupted, the result of the training processing 302 in the first frame can be applied to the inference processing 303 in the second frame.

Next, an example of the hardware configuration of an information processing apparatus according to the present embodiment will be described using the block diagram in FIG. 5. A personal computer (PC), a smartphone, a tablet terminal apparatus, or a similar computer apparatus can be applied as the information processing apparatus according to the present embodiment.

A CPU 506 executes various processing using computer programs and data stored in RAM 509 and ROM 508. Accordingly, the CPU 506 performs operation control of the entire information processing apparatus and executes or controls the various types of processing described herein as processing executed by the information processing apparatus. Note that the CPU 506 is not limited to numbering one, and a plurality may be provided.

The RAM 509 includes an area for storing the computer programs and data loaded from the ROM 508 or a data storage unit 502 and an area for storing the computer programs and data received from an external apparatus via a communication unit 503. Also, the RAM 509 includes a working area used when the CPU 506, an arithmetic unit 507, and an image processing unit 505 execute the various types of processing. The RAM 509 of such a configuration can provide various areas as appropriate.

Setting data of the information processing apparatus, the computer programs and data associated with activating the information processing apparatus, the computer programs and data associated with the basic operations of the information processing apparatus, and the like are stored in the ROM 508. The computer programs and data stored in the ROM 508 are loaded on the RAM 509 according to control by the CPU 506 as appropriate and are the targets of processing by the CPU 506.

An input unit 501 is a user interface such as a keyboard, a mouse, a touch panel, or the like. In response to a user operation, the input unit 501 can input various types of instruction to the CPU 506, the arithmetic unit 507, and the image processing unit 505.

The data storage unit 502 is a large-capacity information storage apparatus such as a hard disk drive apparatus or the like. The data storage unit 502 includes an operating system (OS), the computer programs and data for causing the CPU 506, the arithmetic unit 507, and the image processing unit 505 to execute or control the various types of processing described herein as processing executed by the information processing apparatus, and the like.

The computer programs stored in the data storage unit 502 include computer programs for causing the CPU 506 and the arithmetic unit 507 to execute or control the operations of the identification model described above (the first convolutional layer 101 and the second convolutional layer 102). Also, the data stored in the data storage unit 502 includes the parameters (the first coefficient 104 and the second coefficient 106) of the identification model described above.

The computer programs and data stored in the data storage unit 502 are loaded on the RAM 509 according to control by the CPU 506 as appropriate and are the targets of processing by the CPU 506, the arithmetic unit 507, and the image processing unit 505.

Note that the data storage unit 502 may be an apparatus for reading and writing the computer programs and data to/from a memory apparatus. Examples of the memory apparatus include a flexible disk, a CD-ROM, a CD-R, a DVD, a memory card, a CF card, SmartMedia, an SD card, a memory stick, an xD-picture card, a USB memory, and the like. In this case, the computer programs and data described above as being stored in the data storage unit 502 are stored in the memory apparatus. In this case, the data storage unit 502 loads the computer programs and data stored in the memory apparatus onto the RAM 509 via control by the CPU 506.

Also, a portion of the RAM 509 may be used as the data storage unit 502. Note that in addition to or instead of the data storage unit 502, a storage apparatus of a device connected to via the communication unit 503 may be used.

The communication unit 503 is a communication OF for data communications with an external apparatus. Note that in FIG. 5, the information processing apparatus includes the input unit 501, the data storage unit 502, and a display unit 504, but these may be implemented as devices connected to the information processing apparatus via the communication unit 503.

The display unit 504 includes a liquid crystal screen or a touch panel screen and displays the results of the processing of the CPU 506, the arithmetic unit 507, and the image processing unit 505 using images, characters, and the like.

Note that the display unit 504 may be a projection apparatus such as a projector that projects images and characters.

Note that as in a known touch screen apparatus, the display unit 504 and the input unit 501 may be integrally formed. In this case, input for the input unit 501 corresponds to input via the touch screen.

When the image processing unit 505 receives a command from the CPU 506, image processing, such as range adjustment of the pixel values of the image stored in the data storage unit 502, is executed according to the command, and the image obtained via image processing is stored in the RAM 509.

When the arithmetic unit 507 receives a command from the CPU 506, the arithmetic unit 507 executes the arithmetic processing required for the inference processing and the training processing described above. The arithmetic unit 507 includes internal memory as required to execute the arithmetic processing. The various types of data illustrated in FIG. 1, for example, the frame 103, the first coefficient 104, the second coefficient 106, and the tracking result 107, are all stored in the internal memory of the arithmetic unit 507 or the RAM 509, and the arithmetic unit 507 reads and writes this data in the process of executing the arithmetic processing.

The input unit 501, the data storage unit 502, the communication unit 503, the display unit 504, the image processing unit 505, the CPU 506, the arithmetic unit 507, the ROM 508, and the RAM 509 are all connected to a system bus 510.

Next, processing executed by the information processing apparatus to execute the inference processing and the training processing described above in the current frame period will be described with reference to the flowchart in FIG. 4. Note that the information processing apparatus can execute the inference processing and the training processing for each frame period (each frame) by executing the processing according to the flowchart in FIG. 4 for each frame period (each frame).

In step S401, the CPU 506 determines whether or not first information indicating that the inference processing in the frame period (previous frame period) preceding the current frame period has been completed is stored in the RAM 509. Also, the CPU 506 determines whether or not second information indicating that the training processing in the previous frame period has been completed is stored in the RAM 509.

When the determination result is that the first information is stored in the RAM 509 and the second information is not stored in the RAM 509, the CPU 506 determines that "in the previous frame period, the inference processing has been completed but the training processing has not been completed", and the processing proceeds to step S402.

When the determination result is that the first information and the second information are both stored in the RAM 509, the CPU 506 determines that "in the previous frame period, the inference processing and the training processing have been completed", and the processing proceeds to step S404.

Also, when the determination result is that neither the first information nor the second information is stored in the RAM 509, the processing proceeds to step S404. Note that when neither the first information nor the second information is stored in the RAM 509 and the inference processing that should have been executed in the previous frame period is restarted in the next frame period, the processing that should have been executed in the previous frame period may be discarded if it is not desirable that the delays in frame processing keep building up.

Note that when the current frame period is the initial frame period, the processing proceeds to step S404 without the CPU 506 determining whether or not the first information and the second information are stored in the RAM 509.

In step S402, the CPU 506 issues an operation command (operation instruction) to the arithmetic unit 507. The arithmetic unit 507 executes the training processing for the frame (previous frame) corresponding to the previous frame period according to the operation command (operation instruction). Then, the arithmetic unit 507 notifies the CPU 506 of the completion of processing.

In step S403, the arithmetic unit 507 determines whether or not the training processing has been completed for the previous frame. Also, in step S403, the CPU 506 determines whether or not an interrupt instruction has been issued. An interrupt instruction may be issued by the CPU 506 in response to the user operating the input unit 501 or may be issued in response to the CPU 506 detecting that a condition has been satisfied.

When the determination result is that the training processing for the previous frame has been completed, the processing proceeds to step S404. Also, when the training processing for the previous frame has not been completed, the processing proceeds to step S402 and the training processing continues. Also, when the CPU 506 determines that an interrupt instruction has been issued, the processing for the current frame according to the flowchart in FIG. 4 is ended.

In step S404, the CPU 506 issues an operation command (operation instruction) to the arithmetic unit 507. The arithmetic unit 507 executes the inference processing for the frame (current frame) corresponding to the current frame period according to the operation command (operation instruction). Then, the arithmetic unit 507 stores the tracking result 107 in the RAM 509 and notifies the CPU 506 of the completion of processing.

In step S405, the arithmetic unit 507 determines whether or not the inference processing for the current frame has been completed (whether or not the tracking result 107 of the identification model with the current frame input as the frame 103 has been obtained). Also, in step S405, the CPU 506 determines whether or not an interrupt instruction has been issued.

When the determination result is that the inference processing for the current frame has been completed (that the tracking result 107 of the identification model with the current frame input as the frame 103 has been obtained), the processing proceeds to step S406.

Also, when the inference processing for the current frame has not been completed (that the tracking result 107 of the identification model with the current frame input as the frame 103 has not been obtained), the processing proceeds to step S404 and the inference processing continues.

Also, when the CPU 506 determines that an interrupt instruction has been issued, the processing for the current frame according to the flowchart in FIG. 4 is ended.

In step S406, the CPU 506 stores (records) the first information in the RAM 509. In this manner, after the processing of step S406, when the determination processing of step S401 has been executed for the frame period subsequent to the current frame period (a frame period corresponding to the subsequent frame subsequent to the current frame), it is determined that the first information indicating that the inference processing has been completed in the previous frame period is stored in the RAM 509.

In step S407, the CPU 506 issues an operation command (operation instruction) to the arithmetic unit 507. The arithmetic unit 507 executes the training processing for the frame (current frame) corresponding to the current frame period according to the operation command (operation instruction). Then, the arithmetic unit 507 notifies the CPU 506 of the completion of processing.

In step S408, the arithmetic unit 507 determines whether or not the training processing has been completed for the current frame. Also, in step S408, the CPU 506 determines whether or not an interrupt instruction has been issued.

When the determination result is that the training processing for the current frame has been completed, the processing proceeds to step S409. Also, when the training processing for the current frame has not been completed, the processing proceeds to step S407 and the training processing continues.

Also, when the CPU 506 determines that an interrupt instruction has been issued, the processing for the current frame according to the flowchart in FIG. 4 is ended.

In step S409, the CPU 506 stores (records) the second information in the RAM 509. In this manner, after the processing of step S409, when the determination processing of step S401 has been executed for the frame period subsequent to the current frame period (a frame period corresponding to the subsequent frame subsequent to the current frame), it is determined that the second information indicating that the training processing has been completed in the previous frame period is stored in the RAM 509.

The processing according to the flowchart in FIG. 4 will now be described using the example illustrated in FIG. 3. First, the processing according to the flowchart in FIG. 4 is executed for the first frame period.

In this example, the first frame period is the initial frame period, and thus the processing proceeds from step S401 to step S404. In step S404, the arithmetic unit 507 executes inference processing 301 for the frame corresponding to the first frame period. Then, when the inference processing 301 is complete, the processing proceeds to step S406 via step S405. In step S406, the CPU 506 stores the first information in the RAM 509. Then, in step S407, the arithmetic unit 507 executes the training processing 302 for the frame corresponding to the first frame period, except that as an interrupt instruction has been issued during the training processing 302, the processing according to the flowchart in FIG. 4 in the first frame period is ended.

Next, the processing according to the flowchart in FIG. 4 in the second frame period is executed and the first information is stored in the RAM 509 and the second information is not stored in the RAM 509. Thus, the processing proceeds from step S401 to step S402.

In step S402, the arithmetic unit 507 executes the training processing 302 for the frame corresponding to the first frame period. Then, when the training processing 302 is complete, the processing proceeds to step S404 via step S403. In step S404, the arithmetic unit 507 executes the inference processing 303 for the frame corresponding to the second frame period. Then, when the inference processing 303 is complete, the processing proceeds to step S406 via step S405. In step S406, the CPU 506 stores the first information in the RAM 509. Thereafter, in step S407, the arithmetic unit 507 executes the training processing 304 for the frame corresponding to the second frame period. Then, when the training processing 304 is complete, the processing proceeds to step S409 via step S408. In step S409, the CPU 506 stores the second information in the RAM 509.

Next, the processing according to the flowchart in FIG. 4 in the third frame period is executed and the first information and the second information are stored in the RAM 509. Thus, the processing proceeds from step S401 to step S404.

In step S404, the arithmetic unit 507 executes the inference processing 305 for the frame corresponding to the third frame period. Then, when the inference processing 305 is complete, the processing proceeds to step S406 via step S405. In step S406, the CPU 506 stores the first information in the RAM 509. Thereafter, in step S407, the arithmetic unit 507 executes the training processing 306 for the frame corresponding to the third frame period. Then, when the training processing 306 is complete, the processing proceeds to step S409 via step S408. In step S409, the CPU 506 stores the second information in the RAM 509.

In this manner, according to the present embodiment, even when processing is interrupted by an interrupt instruction in the previous frame period, the training processing that should have been executed in the previous frame period is completed before the subsequent inference processing. Thus, the second coefficient 106 can be appropriately updated in the current frame period. This can prevent tracking failures caused by the second coefficient 106 not being updated.

Modified Example of First Embodiment

In this modified example of the first embodiment, the training processing for the previous frame and the inference processing for the current frame are executed in parallel. By using such a configuration, in addition to the effects according to the first embodiment, an increase in the processing time for the current frame period can be prevented. The differences with the first embodiment will be described below, and unless particularly mentioned, the other components are the same as in the first embodiment.

FIG. 6 is a block diagram illustrating a configuration example of the arithmetic unit 507 according to the present modified example. When an operation command (operation instruction) is received from the CPU 506, a control unit 601 performs operational control of an inference arithmetic unit 601 and a training arithmetic unit 602 in response to the operation command (operation instruction).

The inference arithmetic unit 601 is an arithmetic unit that executes the inference processing described above, the training arithmetic unit 602 is an arithmetic unit that executes the training processing described above, and each can operate independent of one another. The inference arithmetic unit 601 and the training arithmetic unit 602 execute processing using data stored in a storage unit 604 and store the processing result in the storage unit 604.

Note that the functional units illustrated in FIG. 6 may be substituted for other functional units illustrated in FIG. 5. For example, a control unit 603 may be substituted for the CPU 506, the storage unit 604 may be substituted for the RAM 509, and the inference arithmetic unit 601 and the training arithmetic unit 602 may be substituted for the CPU 506.

A timechart according to the present modified example is illustrated in FIG. 7. In the case illustrated in FIG. 7, training processing 703 in the first frame period is interrupted by an interrupt instruction.

Inference processing 701 executed in the first frame period corresponds to the processing (processing for obtaining the intermediate output 105 from the frame 103) by the first convolutional layer 101 from among the processing included in the inference processing 301 described above. Inference processing 702 executed in the first frame period corresponds to the processing (processing for obtaining the tracking result 107 from the intermediate output 105) by the second convolutional layer 102 from among the processing included in the inference processing 301 described above.

Inference processing 704 executed in the second frame period corresponds to the processing by the first convolutional layer 101 from among the processing included in the inference processing 303 described above. Inference processing 705 executed in the second frame period corresponds to the processing by the second convolutional layer 102 from among the processing included in the inference processing 303 described above.

Inference processing 707 executed in the third frame period corresponds to the processing by the first convolutional layer 101 from among the processing included in the inference processing 305 described above. Inference processing 708 executed in the third frame period corresponds to the processing by the second convolutional layer 102 from among the processing included in the inference processing 305 described above.

When the inference processing 701 and the inference processing 702 in the first frame period are complete, the training processing 703 is started, but an interrupt instruction is issued during the training processing 703, causing the training processing 703 to be interrupted.

In the second frame period, first, the interrupted training processing 703 starts. Here, the inference processing 704 is a processing using the first convolutional layer 101, and thus the first coefficient 104 is used but the second coefficient 106 is not used. In other words, the inference processing 704 is not affected by the training processing 703 and may thus be executed in parallel with the training processing 703. In FIG. 7, in the second frame period, the interrupted training processing 703 is started together with the inference processing 704, with the training processing 703 and the inference processing 704 being executed in parallel. Also, the inference processing 705 is processing executed using the second convolutional layer 102 set with the second coefficient 106 updated by the training processing 703, and thus is started after the training processing 703 is complete. In the present modified example, the inference arithmetic unit 601 and the training arithmetic unit 602 operate independently of one another, and thus the training processing 703 and the inference processing 704 can be executed in parallel. In the timechart illustrated in FIG. 7, the amount of time required for all of the processing of the second frame period is unchanged from the first embodiment even when the training processing 703 is executed again in the second frame. In other words, compared to the first embodiment, the processing time of the second frame period can be decreased by an amount corresponding to the training processing 703.

When the inference processing 705 is complete, a training processing 706 corresponding to the second frame period is started. Then, in the third frame period, the inference processing 707 and the inference processing 708 are executed, and when the inference processing 708 is complete, training processing 709 is executed.

Next, processing executed by the information processing apparatus to execute the inference processing and the training processing described above in the current frame period will be described with reference to the flowcharts in FIGS. 8A and 8B. Note that the information processing apparatus can execute the inference processing and the training processing for each frame period (each frame) by executing the processing according to the flowcharts in FIGS. 8A and 8B for each frame period (each frame).

Hereinafter, in the inference processing, processing executed using the first convolutional layer 101 is referred to as first inference processing, and processing executed using the second convolutional layer 102 is referred to as second inference processing.

In step S801, the CPU 506 determines whether or not fourth information indicating that the second inference processing in the frame period (previous frame period) preceding the current frame period has been completed is stored in the RAM 509. Also, the CPU 506 determines whether or not the second information indicating that the training processing in the previous frame period has been completed is stored in the RAM 509.

When the determination result is that the fourth information is stored in the RAM 509 and the second information is not stored in the RAM 509, the CPU 506 determines that "in the previous frame period, the first inference processing and the second inference processing have been completed but the training processing has not been completed". Then, the processing proceeds to step S802.

When the determination result is that the fourth information and the second information are both stored in the RAM 509, the CPU 506 determines that "in the previous frame period, the first inference processing, the second inference processing, and the training processing have been completed", and the processing proceeds to step S803.

Also, when the determination result is that neither the fourth information nor the second information is stored in the RAM 509, the processing proceeds to step S803. Note that when neither the fourth information nor the second information is stored in the RAM 509 and the inference processing that should have been executed in the previous frame period is restarted in the next frame period, the processing that should have been executed in the previous frame period may be discarded if it is not desirable that the delays in frame processing keep building up.

Note that when the current frame period is the initial frame period, the processing proceeds to step S803 without the CPU 506 determining whether or not the fourth information and the second information are stored in the RAM 509.

In step S802, the CPU 506 issues an operation command (operation instruction) to the arithmetic unit 507. The training arithmetic unit 602 in the arithmetic unit 507 executes the training processing for the frame (previous frame) corresponding to the previous frame period according to the operation command (operation instruction).

In step S803, the CPU 506 issues an operation command (operation instruction) to the arithmetic unit 507. The inference arithmetic unit 601 in the arithmetic unit 507 executes the first inference processing for the frame (current frame) corresponding to the current frame period according to the operation command (operation instruction). Then, the arithmetic unit 507 stores the intermediate output 105, which is the result of the first inference processing, in the RAM 509 and notifies the CPU 506 of the completion of processing.

In step S804, the arithmetic unit 507 determines whether or not the training processing has been completed for the previous frame and whether or not the first inference processing has been completed for the current frame. Also, in step S405, the CPU 506 determines whether or not an interrupt instruction has been issued.

When the determination result is that the training processing for the previous frame and the first inference processing for the current frame have not been completed, the processing proceeds to step S802. Also, when the determination result is that the training processing for the previous frame has been completed but the first inference processing for the current frame has not been completed, the processing proceeds to step S803. When the determination result is that the training processing for the previous frame and the first inference processing for the current frame have both been completed, the processing proceeds to step S805. Also, when the CPU 506 determines that an interrupt instruction has been issued as the result of the determination, the processing for the current frame according to the flowcharts in FIGS. 8A and 8B is ended.

In step S805, the CPU 506 issues an operation command (operation instruction) to the arithmetic unit 507. The inference arithmetic unit 601 in the arithmetic unit 507 executes the second inference processing for the frame (current frame) corresponding to the current frame period according to the operation command (operation instruction). Then, the arithmetic unit 507 stores the tracking result 107, which is the result of the second inference processing, in the RAM 509 and notifies the CPU 506 of the completion of processing.

In step S806, the arithmetic unit 507 determines whether or not the second inference processing has been completed for the current frame. Also, in step S806, the CPU 506 determines whether or not an interrupt instruction has been issued.

When the determination result is that the second inference processing for the current frame has not been completed, the processing proceeds to step S805 and the second inference processing continues. Also, when the determination result is that the second inference processing for the current frame has been completed, the processing proceeds to step S807. Also, when the CPU 506 determines that an interrupt instruction has been issued as the result of the determination, the processing for the current frame according to the flowcharts in FIGS. 8A and 8B is ended.

In step S807, the CPU 506 stores the fourth information in the RAM 509. In this manner, after the processing of step S807, when the determination processing of step S801 has been executed for the frame period subsequent to the current frame period (a frame period corresponding to the subsequent frame subsequent to the current frame), it is determined that the fourth information indicating that the second inference processing has been completed in the previous frame period is stored in the RAM 509.

In step S808, the CPU 506 issues an operation command (operation instruction) to the arithmetic unit 507. The training arithmetic unit 602 in the arithmetic unit 507 executes the training processing for the frame (current frame) corresponding to the current frame period according to the operation command (operation instruction). Then, the arithmetic unit 507 notifies the CPU 506 of the completion of processing.

In step S809, the arithmetic unit 507 determines whether or not the training processing has been completed for the current frame. Also, in step S809, the CPU 506 determines whether or not an interrupt instruction has been issued.

When the determination result is that the training processing for the current frame has been completed, the processing proceeds to step S810. Also, when the training processing for the current frame has not been completed, the processing proceeds to step S808 and the training processing continues. Also, when the CPU 506 determines that an interrupt instruction has been issued, the processing for the current frame according to the flowcharts in FIGS. 8A and 8B is ended. In step S810, the CPU 506 stores the second information in the RAM 509.

The processing according to the flowcharts in FIGS. 8A and 8B will now be described using the example illustrated in FIG. 7. First, the processing according to the flowcharts in FIGS. 8A and 8B is executed for the first frame period.

In this example, the first frame period is the initial frame period, and thus the processing proceeds from step S801 to step S803. In step S803, the arithmetic unit 507 executes the inference processing 701 for the frame corresponding to the first frame period. Then, when the inference processing 701 is complete, the processing proceeds to step S805 via step S804. In step S805, the arithmetic unit 507 executes the inference processing 702 for the frame corresponding to the first frame period. Then, when the inference processing 702 is complete, the processing proceeds to step S807 via step S806. In step S807, the CPU 506 stores the fourth information in the RAM 509. Then, in step S808, the arithmetic unit 507 executes the training processing 703 for the frame corresponding to the first frame period, except that as an interrupt instruction has been issued during the training processing 703, the processing according to the flowcharts in FIGS. 8A and 8B in the first frame period is ended.

Next, the processing according to the flowcharts in FIGS. 8A and 8B in the second frame period is executed and the fourth information is stored in the RAM 509 and the second information is not stored in the RAM 509. Thus, the processing proceeds from step S801 to step S802.

In step S802, the arithmetic unit 507 executes the training processing 703 for the frame corresponding to the first frame period, and in step S803, the arithmetic unit 507 executes the inference processing 704 for the frame corresponding to the second frame period. When the inference processing 704 and the training processing 703 are complete, the processing proceeds to step S805 via step S804. In step S805, the arithmetic unit 507 executes the inference processing 705 for the frame corresponding to the second frame period. When the inference processing 705 is complete, the processing proceeds from step S806 to step S807. In step S807, the CPU 506 stores the fourth information in the RAM 509. Thereafter, in step S808, the arithmetic unit 507 executes the training processing 706 for the frame corresponding to the second frame period. Then, when the training processing 706 is complete, the processing proceeds to step S810 via step S809. In step S810, the CPU 506 stores the second information in the RAM 509.

Next, the processing according to the flowcharts in FIGS. 8A and 8B in the third frame period is executed and the fourth information and the second information are stored in the RAM 509. Thus, the processing proceeds from step S801 to step S803.

In step S803, the arithmetic unit 507 executes the inference processing 707 for the frame corresponding to the third frame period. Then, when the inference processing 707 is complete, the processing proceeds to step S805 via step S804. In step S805, the arithmetic unit 507 executes the inference processing 708 for the frame corresponding to the third frame period. Then, when the inference processing 708 is complete, the processing proceeds to step S807 via step S806. In step S807, the CPU 506 stores the fourth information in the RAM 509. Thereafter, in step S808, the arithmetic unit 507 executes the training processing 709 for the frame corresponding to the third frame period. Then, when the training processing 709 is complete, the processing proceeds to step S810 via step S809. In step S810, the CPU 506 stores the second information in the RAM 509.

In this manner, according to the present modified example, in the inference processing for the current frame, the first inference processing that does not use the second coefficient 106 (is not affected by the training processing) and the training processing of the previous frame are executed in parallel, allowing the processing time of the frame period to be decreased.

Second Embodiment

The differences with the first embodiment will be described below, and unless particularly mentioned, the other components are the same as in the first embodiment. The present embodiment is an example of a method for restarting inference processing of a previous frame period when an interrupt occurs during the inference processing in the previous frame period. According to the method described below, the inference processing and the training processing can be completed before the start of the processing of the current frame, which is the processing that requires the result of the training processing of the previous frame period.

Figure 9:
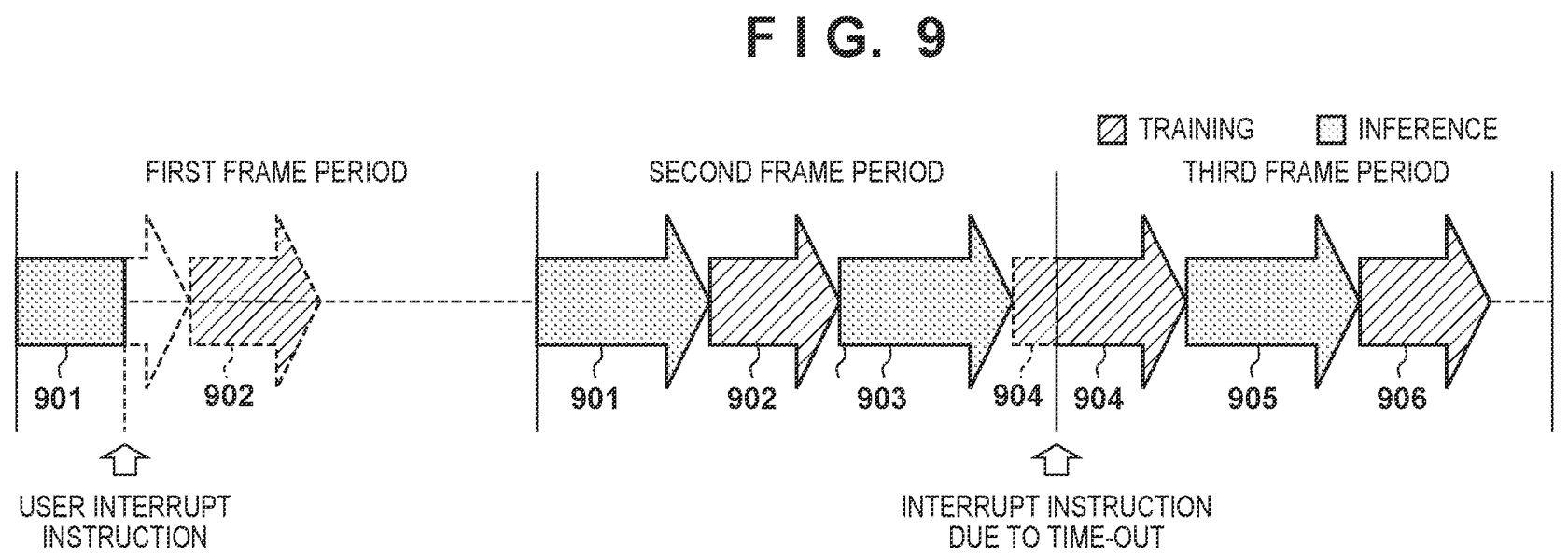

A timechart according to the present embodiment is illustrated in FIG. 9. In the case illustrated in FIG. 9, inference processing 901 in the first frame period is interrupted by an interrupt instruction.

When the inference processing 901 in the first frame period is interrupted, training processing 902 that should be executed in the first frame period is not executed in the first frame period, and the interrupted inference processing 901 is executed first in the second frame period. Then, when the inference processing 901 is complete, the training processing 902 is executed. When the training processing 902 ends, inference processing 903 and training processing 904 that are executed in the second frame period are executed, but a time-out occurs at the end timing of the second frame period, and thus the processing being executed is interrupted. In the example illustrated in FIG. 9, the inference processing 903 is complete, but the training processing 904 is interrupted due to the time-out. Then, in the third frame period, first, the training processing 904 interrupted due to the time-out is executed, and then inference processing 905 and training processing 906 that are executed in the third frame period are executed.

In this manner, the second coefficient 106 can be updated by the training processing 902 before the inference processing 903 of the second frame period is executed, and the second coefficient 106 can be updated by the training processing 904 before the inference processing 905 of the third frame period is executed.

In other words, even when the inference processing 901 in the first frame period is interrupted by an instruction in response to a user operation, the result of the training processing 902 can be applied to the inference processing 903, and the result of the training processing 904 can be applied to the inference processing 905.

Next, processing executed by the information processing apparatus to execute the inference processing and the training processing described above in the current frame period will be described with reference to the flowcharts in FIGS. 10A and 10B. Note that the information processing apparatus can execute the inference processing and the training processing for each frame period (each frame) by executing the processing according to the flowcharts in FIGS. 10A and 10B for each frame period (each frame).

In step S1001, the CPU 506 determines whether or not the first information indicating that inference processing in the frame period (previous frame period) preceding the current frame period has been completed is stored in the RAM 509. Also, the CPU 506 determines whether or not the second information indicating that the training processing in the previous frame period has been completed is stored in the RAM 509.

When the determination result is that the first information is stored in the RAM 509 and the second information is not stored in the RAM 509, the CPU 506 determines that "in the previous frame period, the inference processing has been completed but the training processing has not been completed", and the processing proceeds to step S1004.

When the determination result is that the first information and the second information are both stored in the RAM 509, the CPU 506 determines that "in the previous frame period, the inference processing and the training processing have been completed", and the processing proceeds to step S1006.

Also, when the determination result is that neither the first information nor the second information is stored in the RAM 509, the processing proceeds to step S1002. Note that when neither the first information nor the second information is stored in the RAM 509 and the inference processing that should have been executed in the previous frame period is restarted in the next frame period, the processing that should have been executed in the previous frame period may be discarded if it is not desirable that the delays in frame processing keep building up.

Note that when the current frame period is the initial frame period, the processing proceeds to step S1006 without the CPU 506 determining whether or not the first information and the second information are stored in the RAM 509.

In step S1002, the CPU 506 issues an operation command (operation instruction) to the arithmetic unit 507. The arithmetic unit 507 executes the inference processing for the frame (previous frame) corresponding to the previous frame period according to the operation command (operation instruction). Then, the arithmetic unit 507 stores the tracking result 107 in the RAM 509 and notifies the CPU 506 of the completion of processing.

In S1003, the arithmetic unit 507 determines whether or not the inference processing has been completed for the previous frame. Also, in step S1003, the CPU 506 determines whether or not an interrupt instruction has been issued.

When the determination result is that the inference processing for the previous frame has been completed, the processing proceeds to step S1004. Also, when the inference processing for the previous frame has not been completed, the processing proceeds to step S1002 and the inference processing continues. Also, when the CPU 506 detects that an interrupt instruction has been issued, the processing for the current frame according to the flowcharts in FIGS. 10A and 10B is ended.

In step S1004, the CPU 506 issues an operation command (operation instruction) to the arithmetic unit 507. The arithmetic unit 507 executes the training processing for the frame (previous frame) corresponding to the previous frame period according to the operation command (operation instruction). Then, the arithmetic unit 507 notifies the CPU 506 of the completion of processing.

In step S1005, the arithmetic unit 507 determines whether or not the training processing has been completed for the previous frame. Also, in step S1005, the CPU 506 determines whether or not an interrupt instruction has been issued.

When the determination result is that the training processing for the previous frame has been completed, the processing proceeds to step S1006. Also, when the training processing for the previous frame has not been completed, the processing proceeds to step S1004 and the training processing continues.

Also, when the CPU 506 detects that an interrupt instruction has been issued, the processing for the current frame according to the flowcharts in FIGS. 10A and 10B is ended.

In step S1006, the CPU 506 issues an operation command (operation instruction) to the arithmetic unit 507. The arithmetic unit 507 executes the inference processing for the frame (current frame) corresponding to the current frame period according to the operation command (operation instruction). Then, the arithmetic unit 507 stores the tracking result 107 in the RAM 509 and notifies the CPU 506 of the completion of processing.

In step S1007, the arithmetic unit 507 determines whether or not the inference processing has been completed for the current frame. Also, in step S1007, the CPU 506 determines whether or not an interrupt instruction has been issued (whether or not an interrupt instruction has been input via a user operation or whether or not the CPU 506 or the like has issued an interrupt instruction due to the time-out).

When the determination result is that the inference processing for the current frame has been completed, the processing proceeds to step S1008. Also, when the inference processing for the current frame has not been completed, the processing proceeds to step S1006 and the inference processing continues. Also, when an interrupt instruction has been issued, the processing for the current frame according to the flowcharts in FIGS. 10A and 10B is ended.

In step S1008, the CPU 506 stores the first information in the RAM 509. In this manner, after the processing of step S1008, when the determination processing of step S1001 has been executed for the frame period subsequent to the current frame period (a frame period corresponding to the subsequent frame subsequent to the current frame), it is determined that the first information indicating that the inference processing has been completed in the previous frame period is stored in the RAM 509.

In step S1009, the CPU 506 issues an operation command (operation instruction) to the arithmetic unit 507. The arithmetic unit 507 executes the training processing for the frame (current frame) corresponding to the current frame period according to the operation command (operation instruction). Then, the arithmetic unit 507 notifies the CPU 506 of the completion of processing.

In step S1010, the arithmetic unit 507 determines whether or not the training processing has been completed for the current frame. Also, in step S1010, the CPU 506 determines whether or not an interrupt instruction has been issued (whether or not an interrupt instruction has been input via a user operation or whether or not the CPU 506 or the like has issued an interrupt instruction due to the time-out).

When the determination result is that the training processing for the current frame has been completed, the processing proceeds to step S1011. Also, when the training processing for the current frame has not been completed, the processing proceeds to step S1009 and the training processing continues. Also, when an interrupt instruction has been issued, the processing for the current frame according to the flowcharts in FIGS. 10A and 10B is ended.

In step S1011, the CPU 506 stores the second information in the RAM 509. In this manner, after the processing of step S1011, when the determination processing of step S1001 has been executed for the frame period subsequent to the current frame period (a frame period corresponding to the subsequent frame subsequent to the current frame), it is determined that the second information indicating that the training processing has been completed in the previous frame period is stored in the RAM 509.

In this manner, according to the present embodiment also, even when processing is interrupted by an interrupt instruction, the training processing that should have been executed in the previous frame period is completed before the subsequent inference processing. Thus, the second coefficient 106 can be appropriately updated in the current frame period. This can prevent tracking failures caused by the second coefficient 106 not being updated.

Modified Example of Second Embodiment

In this modified example of the second embodiment, the training processing for the previous frame and the inference processing for the current frame are executed in parallel. By using such a configuration, in addition to the effects according to the second embodiment, an increase in the processing time for the current frame period can be prevented. Also, when up to the first inference processing is completed in the previous frame, by the processing being started from the second inference processing, an increase in the processing time can be decreased. The differences with the second embodiment will be described below, and unless particularly mentioned, the other components are the same as in the second embodiment.

A timechart according to the present modified example is illustrated in FIG. 11. In the case illustrated in FIG. 11, inference processing 1102 in the first frame period is interrupted by an interrupt instruction.

Inference processing 1101 executed in the first frame period corresponds to the processing by the first convolutional layer 101 from among the processing included in the inference processing 301 described above. Also, the inference processing 1102 executed in the first frame period corresponds to the processing by the second convolutional layer 102 from among the processing included in the inference processing 301 described above.

When the inference processing 1101 and the inference processing 1102 in the first frame period are complete, training processing 1103 is started, but an interrupt instruction is issued during the inference processing 1102, causing the inference processing 1102 and the training processing 1103 to be interrupted.

In the second frame period, the interrupted inference processing 1102 is executed. After the inference processing 1102 is complete, the training processing 1103 and inference processing 1104 (the processing by the first convolutional layer 101 from among the processing included in the inference processing 302 described above) are executed in parallel. The inference processing 1104 is a processing using the first convolutional layer 101, and thus the first coefficient 104 is used but the second coefficient 106 is not used. In other words, the inference processing 1104 is not affected by the training processing 1103 and may thus be executed in parallel with the training processing 1103. Also, inference processing 1105 is executed using the second convolutional layer 102 set with the second coefficient 106 updated by the training processing 1103, and thus the inference processing 1105 is started after the training processing 1103 is complete. Then, when the inference processing 1105 is complete, training processing 1106 is executed. In the third frame period, the inference processing 1107 is executed. The inference processing 1108 is executed after the inference processing 1107 is complete. And the training processing 1109 is executed after the inference processing 1108 is complete.

Next, processing executed by the information processing apparatus to execute the inference processing and the training processing described above in the current frame period will be described with reference to the flowcharts in FIGS. 12A and 12B. Note that the information processing apparatus can execute the inference processing and the training processing for each frame period (each frame) by executing the processing according to the flowcharts in FIGS. 12A and 12B for each frame period (each frame).

In step S1201, the CPU 506 determines whether or not third information indicating that the first inference processing in the frame period (previous frame period) preceding the current frame period has been completed is stored in the RAM 509. Also, the CPU 506 determines whether or not the fourth information indicating that the second inference processing in the previous frame period has been completed is stored in the RAM 509. Also, the CPU 506 determines whether or not the second information indicating that the training processing in the previous frame period has been completed is stored in the RAM 509.

When the determination result is that the third information is stored in the RAM 509 and the fourth information and the second information are not stored in the RAM 509, the CPU 506 determines that "in the previous frame period, the first inference processing has been completed but the second inference processing and the training processing has not been completed". Then, the processing proceeds to step S1204.

Also, when the determination result is that the third information and the fourth information are stored in the RAM 509 and the second information is not stored in the RAM 509, the CPU 506 determines that "in the previous frame period, the first inference processing and the second inference processing have been completed but the training processing has not been completed". Then, the processing proceeds to step S1206.

When the determination result is that the third information, the fourth information, and the second information are stored in the RAM 509, the CPU 506 determines that "in the previous frame period, the first inference processing, the second inference processing, and the training processing have been completed", and the processing proceeds to step S1207.

Also, when the determination result is that neither the third information, the fourth information, nor the second information is stored in the RAM 509, the processing proceeds to step S1202. Note that when neither the third information, the fourth information, nor the second information is stored in the RAM 509 and the inference processing that should have been executed in the previous frame period is restarted in the next frame period, the processing that should have been executed in the previous frame period may be discarded if it is not desirable that the delays in frame processing keep building up.

Note that when the current frame period is the initial frame period, the processing proceeds to step S1207 without the CPU 506 determining whether or not the third information, the fourth information, and the second information are stored in the RAM 509.

In step S1202, the CPU 506 issues an operation command (operation instruction) to the arithmetic unit 507. The inference arithmetic unit 601 in the arithmetic unit 507 executes the first inference processing for the frame (previous frame) corresponding to the previous frame period according to the operation command (operation instruction). Then, the arithmetic unit 507 stores the intermediate output 105, which is the result of the first inference processing, in the RAM 509 and notifies the CPU 506 of the completion of processing.

In step S1203, the arithmetic unit 507 determines whether or not the first inference processing has been completed for the previous frame. Also, in step S1203, the CPU 506 determines whether or not an interrupt instruction has been issued.

When the determination result is that the first inference processing for the previous frame has not been completed, the processing proceeds to step S1202 and the first inference processing continues. Also, when the determination result is that the first inference processing for the previous frame has been completed, the processing proceeds to step S1204. Also, when the CPU 506 determines that an interrupt instruction has been issued as the result of the determination, the processing for the current frame according to the flowcharts in FIGS. 12A and 12B is ended.

In step S1204, the CPU 506 issues an operation command (operation instruction) to the arithmetic unit 507. The inference arithmetic unit 601 in the arithmetic unit 507 executes the second inference processing for the previous frame according to the operation command (operation instruction). Then, the arithmetic unit 507 stores the tracking result 107, which is the result of the second inference processing, in the RAM 509 and notifies the CPU 506 of the completion of processing.

In step S1205, the arithmetic unit 507 determines whether or not the second inference processing has been completed for the previous frame. Also, in step S1205, the CPU 506 determines whether or not an interrupt instruction has been issued.

When the determination result is that the second inference processing for the previous frame has not been completed, the processing proceeds to step S1204 and the second inference processing continues. Also, when the determination result is that the second inference processing for the previous frame has been completed, the processing proceeds to step S1206. Also, when the CPU 506 determines that an interrupt instruction has been issued as the result of the determination, the processing for the current frame according to the flowcharts in FIGS. 12A and 12B is ended.

In step S1206, the CPU 506 issues an operation command (operation instruction) to the arithmetic unit 507. The training arithmetic unit 602 in the arithmetic unit 507 executes the training processing for the previous frame according to the operation command (operation instruction). Then, the arithmetic unit 507 notifies the CPU 506 of the completion of processing.

In step S1207, the CPU 506 issues an operation command (operation instruction) to the arithmetic unit 507. The inference arithmetic unit 601 in the arithmetic unit 507 executes the first inference processing for the current frame according to the operation command (operation instruction). Then, the arithmetic unit 507 stores the intermediate output 105, which is the result of the first inference processing, in the RAM 509 and notifies the CPU 506 of the completion of processing.

In step S1208, the arithmetic unit 507 determines whether or not the training processing has been completed for the previous frame and whether or not the first inference processing has been completed for the current frame. Also, in step S405, the CPU 506 determines whether or not an interrupt instruction has been issued.

When the determination result is that the training processing for the previous frame and the first inference processing for the current frame have not been completed, the processing proceeds to step S1206. Also, when the determination result is that the training processing for the previous frame has been completed but the first inference processing for the current frame has not been completed, the processing proceeds to step S1207. When the determination result is that the training processing for the previous frame and the first inference processing for the current frame have both been completed, the processing proceeds to step S1209. Also, when the CPU 506 determines that an interrupt instruction has been issued as the result of the determination, the processing for the current frame according to the flow-charts in FIGS. 12A and 12B is ended.

In step S1209, the CPU 506 stores (records) the third information in the RAM 509. In this manner, after the processing of step S1209, when the determination processing of step S1201 has been executed for the frame period subsequent to the current frame period (a frame period corresponding to the subsequent frame subsequent to the current frame), it is determined that the third information indicating that the first inference processing has been completed in the previous frame period is stored in the RAM 509.

In step S1210, the CPU 506 issues an operation command (operation instruction) to the arithmetic unit 507. The inference arithmetic unit 601 in the arithmetic unit 507 executes the second inference processing for the current frame according to the operation command (operation instruction). Then, the arithmetic unit 507 stores the tracking result 107, which is the result of the second inference processing, in the RAM 509 and notifies the CPU 506 of the completion of processing.

In step S1211, the arithmetic unit 507 determines whether or not the second inference processing has been completed for the current frame. Also, in step S1211, the CPU 506 determines whether or not an interrupt instruction has been issued.

When the determination result is that the second inference processing for the current frame has not been completed, the processing proceeds to step S1210 and the second inference processing continues. Also, when the determination result is that the second inference processing for the current frame has been completed, the processing proceeds to step S1212. Also, when the CPU 506 determines that an interrupt instruction has been issued as the result of the determination, the processing for the current frame according to the flow-charts in FIGS. 12A and 12B is ended.

In step S1212, the CPU 506 stores (records) the fourth information in the RAM 509. In this manner, after the processing of step S1212, when the determination processing of step S1201 has been executed for the frame period subsequent to the current frame period (a frame period corresponding to the subsequent frame subsequent to the current frame), it is determined that the fourth information indicating that the second inference processing has been completed in the previous frame period is stored in the RAM 509.

In step S1213, the CPU 506 issues an operation command (operation instruction) to the arithmetic unit 507. The training arithmetic unit 602 in the arithmetic unit 507 executes the training processing for the current frame according to the operation command (operation instruction). Then, the arithmetic unit 507 notifies the CPU 506 of the completion of processing.

In step S1214, the arithmetic unit 507 determines whether or not the training processing has been completed for the current frame. Also, in step S1214, the CPU 506 determines whether or not an interrupt instruction has been issued.

When the determination result is that the training processing for the current frame has been completed, the processing proceeds to step S1215. Also, when the training processing for the current frame has not been completed, the processing proceeds to step S1213 and the training processing continues. Also, when the CPU 506 determines that an interrupt instruction has been issued, the processing for the current frame according to the flowcharts in FIGS. 12A and 12B is ended. In step S1215, the CPU 506 stores the second information in the RAM 509.

In this manner, according to the present embodiment and as with the second embodiment, even when processing is interrupted by an interrupt instruction, the training processing that should have been executed in the previous frame period is completed before the subsequent second inference processing. Thus, the second coefficient 106 can be appropriately updated in the current frame period.

Also, in the present modified example, as with the modified example of the first embodiment, the first inference processing for the current frame and the training processing for the previous frame can be executed in parallel, allowing the processing time of the frame period to be decreased.

Also, in the present modified example, as seen in the example illustrated in FIG. 11, an increase in the processing time of the inference processing for the second frame period can be decreased. In the present modified example, the inference processing 903 described in the second embodiment is divided in the first inference processing 1104 and the second inference processing 1105, and in the second frame period, processing is restarted from the second inference processing 1105. This allows the processing time to be decreased by an amount corresponding to the first inference processing 1104.

Third Embodiment

In the embodiments and the modified examples described above, the second coefficient 106, which is the parameter the second inference processing requires from the training processing, is updated, but the first coefficient 104, which is the parameter the first inference processing requires from the training processing, may be updated. In this case, the training processing for the previous frame needs to be completed before the first inference processing for the current frame. In the case illustrated in FIG. 11, in the second frame period, the inference processing 1102 and the training processing 1103 are executed in parallel. Then, when this execution is complete, the inference processing 1104 and the training processing of the first coefficient 104 in the training processing 1106 are executed in parallel. Next, the inference processing 1105 is executed. Then, when this execution is complete, the training processing of the second coefficient 106 in the training processing 1106 is executed. In other words, execution of the training processing can be started directly after the first inference processing, and the second inference processing can be executed without waiting for the training processing to be completed. Accordingly, the second inference processing and the training processing for the same frame may be executed in parallel, for example.

Also, in an inference, separate from the inference result, post-processing for generating an ultimately output tracking result may be executed. On the other hand, when the post-processing result cannot be used by the training, the post-processing is executed for only the inference for the current frame, meaning that the post-processing may be omitted in the inference for the previous frame. Accordingly, when the inference processing for the previous frame is executed, compared to executing the inference processing for the current frame, the processing time can be decreased by an amount correspond to the post-processing.

Also, in the modified example of the second embodiment, the inference processing is split into the first inference processing and second inference processing and executed. In the case illustrated in FIG. 11, in the first frame period, up to the first inference processing relating to the first frame is executed, and in the second frame period, processing is started from the second inference processing. However, the training processing may also be split into first training processing and second training processing (for example, in the training processing, the processing in the first half may be the first training processing and the processing in the second half may be the second training processing). Also, for example, when the first training processing in the first frame period has been completed, but the second training processing has not been completed, in the second frame period, first, the processing is started from the second training processing. Then, after the second training processing is complete, processing similar to that in the third frame period illustrated in FIGS. 7 and 11 may be executed. In this manner, as in the modified example of the second embodiment, the processing time can be decreased by an amount corresponding to the first training processing.

Also, the numerical values; processing timing; processing order; processing; subjects of processing; obtaining method, transmission destination, transmission source, and storage place of data (information); and the like used in the embodiments described above are examples for facilitating a detailed description, and no such limitations are intended.

Also, a part or all of the embodiments described above may be combined as appropriate. Furthermore, a part or all of the embodiments described above may be selectively used.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-158760, filed Sep. 30, 2022, which is hereby incorporated by reference herein in its entirety.

What is claimed is:

1. An information processing apparatus comprising:
a processing unit configured to execute, in frame periods corresponding to respective frames, an inference relating to the frame and training relating to the frame, wherein
when an inference relating to a first frame has been completed but training relating to the first frame has not been completed in a first frame period corresponding to the first frame, the processing unit executes in parallel a first inference, of an inference relating to a second frame, not affected by the training relating to the first frame and the training relating to the first frame, and after this execution is complete, executes a second inference, of the inference relating to the second frame, affected by the training relating to the first frame and training relating to the second frame in a second frame period corresponding to the second frame subsequent to the first frame.

2. The information processing apparatus according to claim 1,
wherein the processing unit
stores information indicating that an inference relating to a frame has been completed when the inference is complete, and
stores information indicating that training relating to a frame has been completed when the training is complete.

3. The information processing apparatus according to claim 2, wherein when the processing unit detects an interrupt instruction during execution of an inference, the processing unit does not store information indicating that the inference has been completed.

4. The information processing apparatus according to claim 2, wherein when the processing unit detects an interrupt instruction during execution of training, the processing unit does not store information indicating that the training has been completed.

5. An information processing apparatus comprising:
a processing unit configured to execute, in frame periods corresponding to respective frames, an inference relating to the frame and training relating to the frame, wherein
the processing unit,
when neither an inference nor training relating to a first frame has been completed in a first frame period corresponding to the first frame, in a second frame period corresponding to a second frame subsequent to the first frame, executes the inference and the training relating to the first frame, then executes an inference and training relating to the second frame, and executes processing that has not been completed by an end timing of the second frame period in a frame period corresponding to a subsequent frame subsequent to the second frame and then executes an inference and training relating to the subsequent frame.

6. An information processing apparatus comprising:

a processing unit configured to execute, in frame periods corresponding to respective frames, an inference relating to the frame and training relating to the frame, wherein the processing unit, when a first inference, of an inference relating to a first frame, not affected by training relating to a frame previous to the first frame has been completed but a second inference, of the inference relating to the first frame, affected by the training relating to the frame previous to the first frame and the training relating to the first frame have not been completed in a first frame period corresponding to the first frame, in a second frame period corresponding to a second frame subsequent to the first frame after executing the second inference, executes in parallel a first inference, of the inference relating to the second frame, not affected by the training relating to the first frame and the training relating to the first frame, and after this execution is complete, executes a second inference, of the inference relating to the second frame, affected by the training relating to the first frame, and after this execution is complete, executes the training relating to the second frame.

7. An information processing apparatus comprising:

a processing unit configured to execute, in frame periods corresponding to respective frames, an inference relating to the frame and training relating to the frame, wherein the processing unit, when a first inference, of an inference relating to a first frame, affected by training has been completed but a second inference, of the inference relating to the first frame, affected by training and training relating to the first frame have not been completed in a first frame period corresponding to the first frame, in a second frame period corresponding to a second frame subsequent to the first frame, executes in parallel the second inference and the training relating to the first frame, and after this execution is complete, executes a first inference, of an inference relating to the second frame, affected by training, and after this execution is complete, executes a first training relating to the second frame, and after this execution is complete, executes a second inference, of the inference relating to the second frame, affected by training, and after this execution is complete, executes a second training relating to the second frame.

8. An information processing apparatus comprising:

a processing unit configured to execute, in frame periods corresponding to respective frames, an inference relating to the frame and training relating to the frame, wherein the processing unit, when a first training relating to a first frame in a first frame period corresponding to the first frame has been completed but a second training relating to the first frame in the first frame period has not been completed, first starts the second training in a second frame period corresponding to a second frame subsequent to the first frame.

9. The information processing apparatus according to claim 1, wherein the processing unit when neither the inference nor the training relating to the first frame has been completed, does not execute the inference and the training relating to the first frame.

10. The information processing apparatus according to claim 1, wherein the processing unit when, in the inference, post-processing for generating a tracking result is executed and a result of the post-processing is not used in training, executes post-processing for only an inference relating to a current frame.

11. An information processing apparatus comprising:

a processing unit configured to execute, in frame periods corresponding to respective frames, an inference relating to the frame and training relating to the frame, wherein when an inference relating to a first frame has been completed but training relating to the first frame has not been completed in a first frame period corresponding to the first frame, the processing unit executes the training relating to the first frame and an inference and training relating to a second frame in a second frame period corresponding to the second frame subsequent to the first frame, wherein the inference is tracking processing in which an identification model for identifying a tracking target in a frame is used to identify a tracking target in a frame and track the tracking target, and the training is training processing of the identification model on a basis of a result of the inference.

12. An information processing method executed by an information processing apparatus, comprising:

executing, in frame periods corresponding to respective frames, an inference relating to the frame and training relating to the frame; and when, in the executing, an inference relating to a first frame has been completed but training relating to the first frame has not been completed in a first frame period corresponding to the first frame, the processing unit executes in parallel a first inference, of an inference relating to a second frame, not affected by the training relating to the first frame and the training relating to the first frame, and after this execution is complete, executes a second inference, of the inference relating to the second frame, affected by the training relating to the first frame and training relating to the second frame in a second frame period corresponding to the second frame subsequent to the first frame are executed.

13. A non-transitory computer-readable storage medium storing a computer program for causing a computer to function as a processing unit configured to execute, in frame periods corresponding to respective frames, an inference relating to the frame and training relating to the frame, wherein when an inference relating to a first frame has been completed but training relating to the first frame has not been completed in a first frame period corresponding to the first frame, the processing unit executes in parallel a first inference, of an inference relating to a second frame, not affected by the training relating to the first frame and the training relating to the first frame, and after this execution is complete, executes a second inference, of the inference relating to the second frame, affected by the training relating to the first frame and training relating to the second frame in a second frame period corresponding to the second frame subsequent to the first frame.

14. An information processing apparatus comprising:

a processing unit configured to execute, in frame periods corresponding to respective frames including a movable tracking target as an object, an inference relating to the object in the frame and training relating to the object in the frame, wherein when an inference relating to the object in a first frame has been completed but training relating to the object in the first frame has not been completed in a first frame period corresponding to the first frame, the processing unit executes, in a second frame period corresponding to a second frame subsequent to the first frame, the training relating to the object in the first frame, an inference relating to the object in the second frame using a result of the training relating to the object in the first frame, and training relating to the object in the second frame using a result of the inference relating to the object in the second frame.

15. An information processing method comprising:

processing in frame periods corresponding to respective frames including a movable tracking target as an object, an inference relating to the object in the frame and training relating to the object in the frame, wherein when an inference relating to the object in a first frame has been completed but training relating to the object in the first frame has not been completed in a first frame period corresponding to the first frame, the processing executes, in a second frame period corresponding to a second frame subsequent to the first frame, the training relating to the object in the first frame, an inference relating to the object in the second frame using a result of the training relating to the object in the first frame, and training relating to the object in the second frame using a result of the inference relating to the object in the second frame.

16. A non-transitory computer-readable storage medium storing instruction when executed by a computer cause an information processing apparatus to execute a information processing method, the method comprising:

processing in frame periods corresponding to respective frames including a movable tracking target as an object, an inference relating to the object in the frame and training relating to the object in the frame, wherein when an inference relating to the object in a first frame has been completed but training relating to the object in the first frame has not been completed in a first frame period corresponding to the first frame, the processing executes, in a second frame period corresponding to a second frame subsequent to the first frame, the training relating to the object in the first frame, an inference relating to the object in the second frame using a result of the training relating to the object in the first frame, and training relating to the object in the second frame using a result of the inference relating to the object in the second frame.

17. The information processing apparatus according to claim 14, wherein the training relating to the object in the first frame is not completed in the first frame period because the processing unit detects an interruption instruction during execution of the training relating to the object in the first frame.

* * * * *